United States Patent [19]

Englander et al.

[11] 4,205,488
[45] Jun. 3, 1980

[54] GRINDING MACHINE

[75] Inventors: Gary E. Englander, Shrewsbury; Richard P. Chase, Spencer; Donald P. Anderson, Prinston; Guy D. Metcalf, West Boylston, all of Mass.

[73] Assignee: The Warner & Swasey Company, Cleveland, Ohio

[21] Appl. No.: 905,650

[22] Filed: May 15, 1978

Related U.S. Application Data

[62] Division of Ser. No. 769,945, Feb. 18, 1977, Pat. No. 4,115,958.

[51] Int. Cl.$^2$ ............................................. B24B 5/36
[52] U.S. Cl. ........................... 51/105 SP; 51/165.89; 51/289 R; 51/327
[58] Field of Search ............... 51/327, 105 SP, 105 R, 51/165 R, 165.92, 165.71, 165.72, 165.89, 289 R, 3

[56] References Cited

U.S. PATENT DOCUMENTS

| | | | |
|---|---|---|---|
| 2,813,379 | 11/1957 | Trottier | 51/105 SP |
| 2,955,391 | 10/1960 | Fred | 51/165 R |
| 3,145,507 | 8/1964 | Price | 51/105 SP |
| 3,634,978 | 1/1972 | Uhtenwoldt | 51/165.92 |
| 3,762,102 | 10/1973 | Vetter | 51/105 SP |
| 3,818,642 | 6/1974 | Seidel | 51/165.8 |
| 3,919,614 | 11/1975 | Wespi | 51/165 R |

OTHER PUBLICATIONS

Saimp "RCD" Soc. Az. Industrie Mechaniche Padouane, dated prior to Sep. 1976.
TNC Abrasive centu, Jones & Lamson, n/c O.D. Grinding, dated prior to Jul. 8, 1976.
Amer. Mach., Aug. 1976, pp. 104–105, article "Multiple Diameters Via Microprocessor Grinder", Schaffer.

Primary Examiner—Harold D. Whitehead

[57] ABSTRACT

An improved grinding machine includes a grinding wheel which is moved along a path extending at an acute angle to the axis of rotation of a workpiece. The workpiece is movable along its axis of rotation. During plunge grinding operations, the workpiece can be reciprocated along its axis of rotation. During traverse grinding operations, it is necessary to compensate for the acute angle of the path along which the grinding wheel is moved relative to the axis of rotation of the workpiece. This may be done between traverse grind strokes by initiating movement of the grinding wheel toward the workpiece from a position in which the edge surface of the grinding wheel is offset from the plane of a radially extending shoulder surface. Upon completion of a grinding operation, the wheel is retracted to a clear point. Different clear points are used so that the grinding wheel is retracted to only the extent necessary when finishing portions of a workpiece having different diameters. The position of an edge surface of the grinding wheel along the axis of rotation of the workpiece is indicated by data stored in a Z-axis register. Data corresponding to the distance a face surface on the grinding wheel is spaced from the axis of rotation of the workpiece is stored in an X-axis register. The data stored in both registers is changed when the grinding wheel is moved toward and away from the workpiece along the path which extends at an acute angle to the axis of rotation of the workpiece. However, the data in only the Z-axis register is changed when the workpiece is moved along its axis of rotation relative to the grinding wheel. The data in the Z-axis register is adjusted to compensate for the distance which a reference surface on the workpiece is offset from a zero datum position during an initial workpiece locating operation. To reduce the likelihood of wheel breakage, operation of the grinding machine is automatically interrupted when the current required to drive the grinding wheel exceeds a relatively low predetermined amount during high speed positioning movements of either the grinding wheel or the workpiece. If the current required to drive the grinding wheel exceeds a rated operating load by a predetermined amount during a grinding operation, the grinding operation is also interrupted. Fine and coarse pulse generators are provided in association with drive shafts for moving the grinding wheel and the workpiece. The output from the pulse generators are compared and if there is a predetermined difference in the outputs of the fine and coarse pulse generators associated with a particular drive shaft due to a malfunctioning of the grinding machine, operation of the grinding machine is interrupted.

59 Claims, 29 Drawing Figures

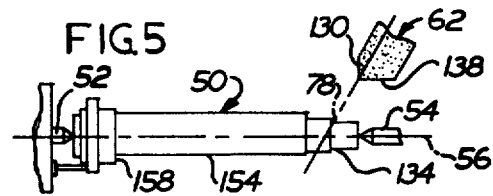
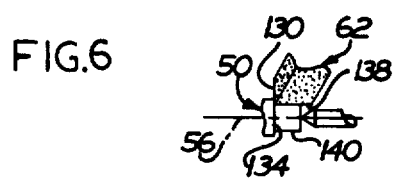
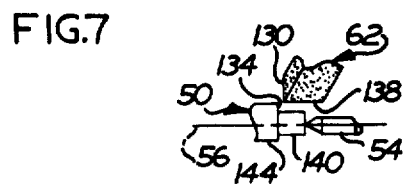
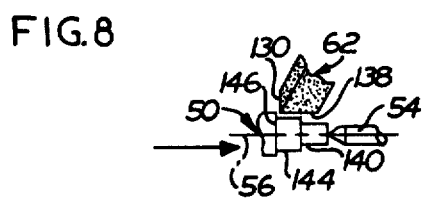
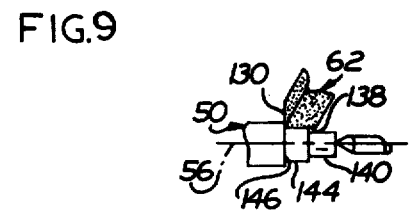
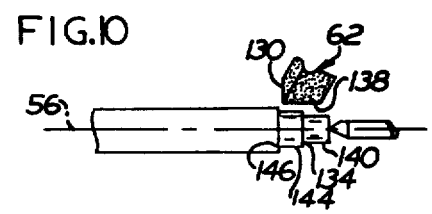
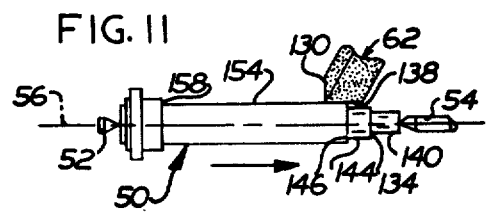
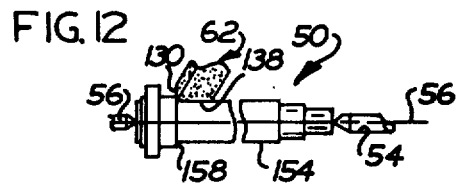
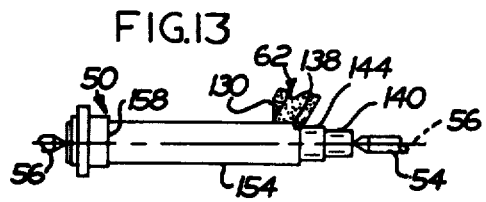
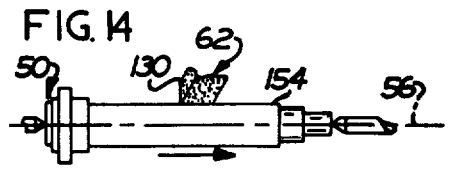
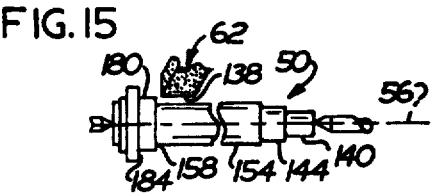
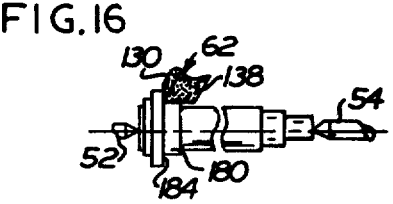
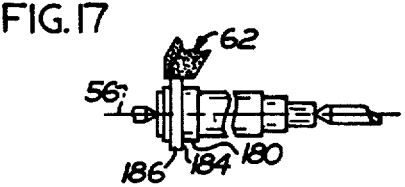
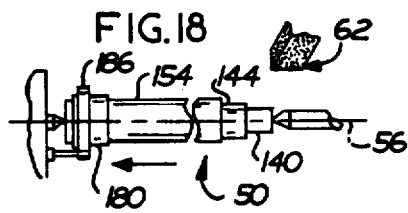

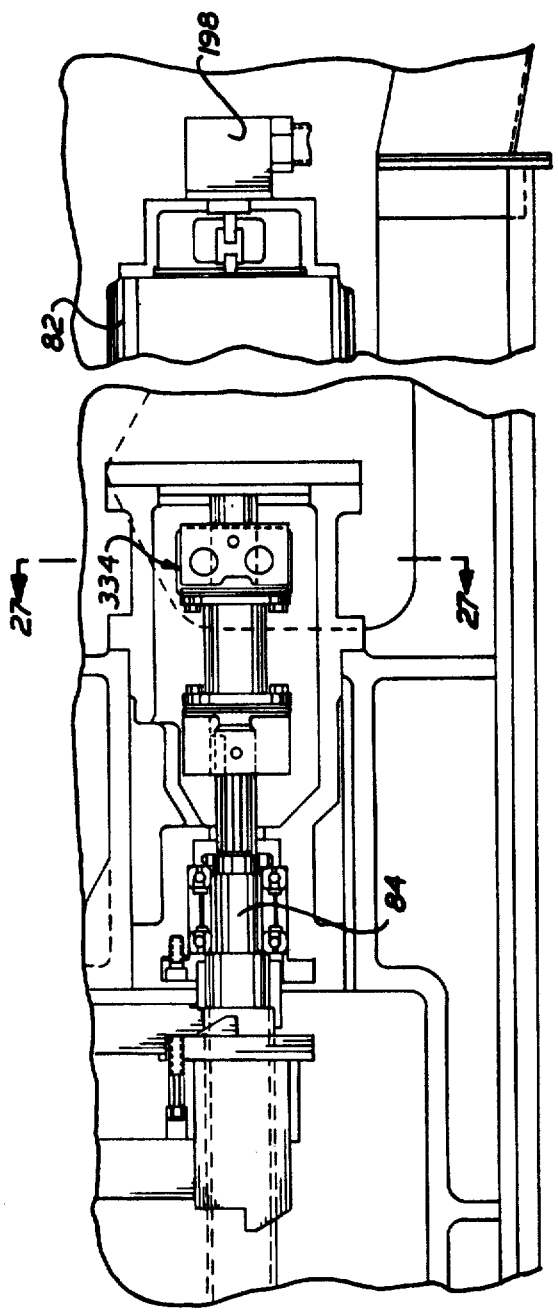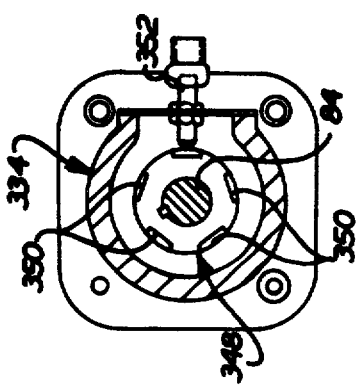

GRINDING MACHINE

This is a division of application Ser. No. 769,945 filed Feb. 18, 1977 now U.S. Pat. No. 4,115,958 issued Sept. 26, 1978.

BACKGROUND OF THE INVENTION

The present invention relates to a new and improved grinding machine and method of operating the machine to grind a workpiece.

Grinding machines having wheels which are movable along a path extending at an acute angle to the axis of rotation of a workpiece are well known. Some of these known grinding machines are disclosed in U.S. Pat. Nos. 2,813,379; 2,955,391; 3,145,507; and 3,762,102. During operation of at least some of these known grinding machines, shoulder and side surfaces of the workpiece have been plunge ground by moving the grinding wheel toward the axis of rotation of the workpiece. As the grinding wheel moves inwardly toward the workpiece, an annular face surface of the grinding wheel is effective to grind a cylindrical side surface of a workpiece to a desired diameter. Simultaneously therewith, an annular edge surface on the grinding wheel is effective to grind a radially extending shoulder surface.

During this plunge grind stroke of a known grinding machine, only a relatively short axially extending portion of the workpiece is ground by the face surface of the grinding wheel. If it is desired to grind an axially extending side portion having a length which is greater than the size of the face surface of the grinding wheel, the grinding wheel is moved away from the workpiece shoulder after completing the plunge grind stroke. The workpiece is then moved along its axis of rotation through a series of traverse grind strokes. During these traverse grind strokes, the edge surface of the grinding wheel is spaced apart from the shoulder surface of the workpiece since the shoulder surface has already been ground to the desired depth. Thus during the traverse grind strokes, only the face surface of the grinding wheel is effective to grind the side surface of a workpiece.

Various control systems have been utilized in association with grinding machines. In addition to the controls disclosed in the forementioned U.S. patents, other grinding control systems are disclosed in the U.S. Pat. Nos. 2,701,494; 3,634,978; 3,818,642; 3,820,287; and 3,919,614. Although various control systems have been utilized in association with grinding machines having wheels which move along a path extending at an acute angle to the axis of rotation of the workpiece, it is believed that these controls have included a register which stores data corresponding to the position of the grinding wheel along its path of movement. However, the positions of both the edge and face surfaces of a grinding wheel vary relative to the workpiece as the grinding wheel moves along a path which extends at an acute angle to the axis of rotation of the workpiece. Therefore, data indicating the position of the grinding wheel along its path of movement does not itself indicate the positions of the edge and face surfaces of the grinding wheel relative to a radially extending shoulder surface and an axially extending side surface of the workpiece.

Dressing of the face and edge surfaces of a grinding wheel which moves along a path extending at an acute angle to the axis of rotation of a workpiece, varies the position of the face surface of the grinding wheel relative to the axially extending side surface of the workpiece and the position of the edge surface of the grinding wheel relative to a radially extending shoulder surface of the workpiece. Therefore, after a wheel dressing operation, the controls for such a grinding wheel must be adjusted to compensate for the amount of material removed from the grinding wheel. This has previously been done by adjusting the data stored in a register indicating the position of the grinding wheel along its angled path of movement relative to the workpiece. It is believed that prior control systems have not provided for the storing and changing of data corresponding to the distance between the edge and face surfaces of the grinding wheel and a radially extending shoulder surface of the workpiece to thereby compensate for the dressing of the grinding wheel. An apparatus for dressing the face and edge surfaces of a grinding wheel which moves along a path extending at an acute angle to the axis of rotation of a workpiece is disclosed in U.S. Pat. No. 3,916,581. Various other devices for dressing grinding wheels are disclosed in U.S. Pat. Nos. 2,894,360; 2,895,265; 2,900,974 and 2,907,315.

The surfaces on a workpiece have previously been accurately located relative to a grinding wheel by the use of a probe which engages a reference surface in a manner similar to that disclosed in U.S. Pat. No. 3,885,734. With these known locator assemblies, the workpiece must be moved to accurately position the reference surface in a predetermined location. Any error in locating the reference surface relative to the predetermined location can result in an error in the grinding of the workpiece. Of course, locating a reference surface exactly in a predetermined reference plane can be a time consuming process.

In addition to encountering difficulty in accurately locating a reference surface on a workpiece relative to the axis of rotation of the workpiece, difficulty has been encountered in moving a grinding wheel through relatively small increments of distance relative to a workpiece. With certain known grinding machines, the grinding wheel may not move through a relatively small distance toward a workpiece when an operator initially actuates the controls. Upon noting the lack of movement of the grinding wheel toward the workpiece, the operator may again actuate the controls. After repeated actuation of the controls, the grinding wheel may move through a relatively large distance toward the axis of rotation of the workpiece. Of course, the resulting movement of the grinding wheel through a relatively large distance could result in a misshaping of the workpiece.

Difficulty has been encountered in removing the same incremental depth of material upon each revolution of the workpiece at locations having different diameters. Thus, the feed rate of a grinding wheel may be such as to remove a small increment of metal during each revolution of a portion of a workpiece having a small diameter. Although it may be desired to remove the same depth of metal during each revolution of a relatively large diameter portion of the workpiece, the feed rates of certain known grinding machines have been such as to effect the removal of a different incremental depth of material on each revolution of a relatively large diameter portion of the workpiece. This is because when the rate of workpiece rotation is adjusted for different diameter portions of a workpiece, the feed rates of the grinding wheel have been manually set to provide a number of inches per minute of wheel feed rate. In setting the wheel feed rate, different incremental depths of material have been removed from the workpiece upon each revolution of the different size portions of the workpiece.

Since the grinding wheel rotates at a relatively high speed and can break when subjected to excessive forces, caution must be exercised in operating a grinding machine. Thus, during rapid movement of a grinding wheel relative to the workpiece and during rapid movement of the workpiece relative to the grinding wheel, care must be exercised to prevent engagement of the grinding wheel with the workpiece and the resulting application of excessive forces to the grinding wheel. In addition, during a grinding operation excessive feed rates of a grinding wheel can result in breaking of the grinding wheel.

It is contemplated that problems could be encountered during operation of a grinding machine if for some unforeseen reason, such as maltreatment of the grinding machine, a malfunction should occur in the wheel or workpiece positioning drive train or controls during operation of the grinding machine. Breakage of a wheel positioning drive shaft would render the machine controls ineffective to move the grinding wheel away from the workpiece. Similarly, breakage of a workpiece positioning drive shaft would render the machine controls ineffective to move a shoulder on the workpiece away from the grinding wheel.

SUMMARY OF THE PRESENT INVENTION

The present invention provides a new and improved method and apparatus for overcoming the aforementioned difficulties which have been encountered during the operation of certain known grinding machines. Thus, the present invention provides a grinding machine which is operated in such a manner as to grind both a radially extending shoulder and an axially extending side of a workpiece with an angled wheel during repeated traverse grind work strokes. At one end of each of the traverse grind work stroke, an edge surface of the grinding wheel engages the radial shoulder of the workpiece while a face surface of the grinding wheel engages a side of the workpiece. To compensate for movement of the grinding wheel toward the shoulder of the workpiece along the angled path, movement of the grinding wheel toward the workpiece is initiated from a position in the edge surface is offset from the plane of a radially extending surface of the shoulder by a distance which is equal to the distance which the grinding wheel moves toward the shoulder along the angled path.

Upon grinding a portion of the workpiece having a first diameter and prior to grinding of a portion of the workpiece having a different diameter, the grinding wheel is retracted to a predetermined clear point. When the grinding wheel has been retracted to the clear point, the face surface of the grinding wheel is disposed a predetermined distance outwardly of the next portion of the workpiece. By selecting a clear point which is disposed only a small distance outwardly of the surface of the portion to be ground next, the grinding wheel is only retracted to the extent necessary.

Although the grinding wheel moves along a path extending at an acute angle to the axis of rotation of the workpiece, the face surface of the grinding wheel extends parallel to the axis of rotation of the workpiece and the edge surface of the grinding wheel extends perpendicular to the axis of rotation of the workpiece. Due to this relationship between the surfaces of the grinding wheel and the workpiece, it is desirable to know the position of the surfaces of the grinding wheel relative to the workpiece in terms of orthogonal axes rather than nonorthogonal axes. This is true even though the grinding wheel moves along a path extending at an acute angle to the axis of rotation of the workpiece.

Accordingly a Z-axis register is provided to store data corresponding to the position of the edge surface of the grinding wheel along the axis of rotation of the workpiece. An X-axis register is provided to store data corresponding to the position of the face surface of the grinding wheel along an axis extending perpendicular to the axis of workpiece rotation. The positions of both the edge and face surfaces of the grinding wheel relative to the two perpendicular axes vary as the grinding wheel is moved along a path extending at an acute angle to one of the axes. Therefore the data stored in both of the registers is varied as the grinding wheel is moved along the path extending at an acute angle to the axis of rotation of the workpiece. In order to compensate for the angled orientation of the path of movement of the grinding wheel, the data stored in the registers is varied as a function of the cosine and sine of the acute angle between the path of movement of the grinding wheel and the axis of rotation of the workpiece. Since the position of the face surface does not vary relative to the axis of rotation of the workpiece upon movement of the workpiece along its axis of rotation, only the data stored in the Z-axis register is varied when the workpiece is moved along its axis of rotation.

During initial locating of a workpiece in association with a grinding machine constructed in accordance with the present invention, a reference surface on the workpiece does not have to be exactly positioned in a predetermined location relative to a reference plane. The workpiece is merely located with the reference surface closely adjacent to the reference plane. The data stored in the Z-axis register is adjusted to compensate for the distance which the reference surface is offset from the radially extending reference plane. It should be noted that having the reference surface on the workpiece offset from the reference plane effects the location of the edge surface of the grinding wheel relative to an axially extending side of the workpiece. Therefore, it is necessary to adjust the data stored in the Z-axis register for the distance which the reference surface is offset from the radially extending reference plane.

A grinding machine operated in accordance with the present invention can effect movement of the grinding wheel through extremely small increments toward the axis of rotation of a workpiece. This is done by moving the grinding wheel away from the workpiece through a relatively large distance and then moving the grinding wheel back toward the workpiece through a distance equal to the sum of the large distance which it was moved away from the workpiece and the small distance which it is desired to move the grinding wheel toward the workpiece. The net result of this movement of the grinding wheel away from and then toward the workpiece is to move the grinding wheel through a small distance toward the workpiece.

A radially extending shoulder on a workpiece can be shifted through a relatively small distance along the axis of rotation of the workpiece in a similar manner. Thus, when the shoulder is to be moved a small distance in a direction away from the grinding wheel, the workpiece is first moved through a relatively large axial distance in a direction away from the grinding wheel. The workpiece is then moved axially back toward the grinding wheel through a distance equal to the relatively large distance minus the relatively small distance.

The grinding machine can be operated in accordance with the present invention to remove the same depth of material from a workpiece during each revolution of relatively large and small diameter portions of the workpiece. This is accomplished by adjusting the grinding wheel feed rate to move the grinding wheel inwardly through the same distance toward the workpiece on each revolution of the workpiece even though the rate of rotation of the workpiece is adjusted to provide a constant surface speed. The manually preset parameters of workpiece diameter and surface speed are automatically manipulated by the control system to calculate and set the correct wheel slide feed rate in inches per minute to correspond to the desired rate of removal of material from the workpiece in inches per revolution of the workpiece.

During rapid movement of the grinding wheel relative to the workpiece and during rapid movement of the workpiece relative to the grinding wheel, there is a relatively small or idle load on the motor which rotates the grinding wheel. Accordingly, a relatively small current is normally required during high speed wheel or workpiece movement to effect operation of the motor which rotates the grinding wheel. If this current increases due to engagement of the grinding wheel with the workpiece or other object, the rapid movement between the grinding wheel and the workpiece is terminated and the grinding wheel is moved to a retracted position. Similarly, if during a grinding operation the current required to operate the motor which effects rotation of the grinding wheel increases to an amount which is greater than a predetermined maximum amount, the grinding operation is interrupted to prevent the application of excessive forces to the grinding wheel.

Although it is contemplated that the drive apparatus and controls for effecting movement of the grinding wheel and the workpiece will not malfunction during normal operation of the grinding machine, it is possible that they could malfunction due to gross mistreatment of the machine or other unforeseen circumstances. To provide for an immediate indication of this occurrence, a fine pulse generator utilized in association with machine control circuitry is connected to one end of a drive shaft while a relatively coarse pulse generator is connected with the opposite end of the drive shaft. If there is a loss of electrical feedback due to wire damage or pulse generator malfunction or if the drive shaft should break between the two pulse generators, the outputs from the two pulse generators would not be in agreement. Therefore, a malfunction can be detected by comparing the output of the two pulse generators. When the outputs of the generators differ by a predetermined amount thereby indicating malfunction, operation of the grinding machine is shut down.

BRIEF DESCRIPTION OF THE DRAWINGS

The foregoing and other features of the present invention will become more apparent upon a consideration of the following description taken in connection with the accompanied drawings wherein:

FIGS. 5–18 are schematic drawings depicting the relationship between the grinding wheel and the workpiece during the grinding of various radially projecting shoulders and axially extending sides of the workpiece;

FIG. 26 is an enlarged view, illustrating the relationship between a grinding wheel positioning drive shaft, a motor for rotating the drive shaft and a pair of pulse generators utilized in association with the drive shaft;

FIG. 27 is a sectional view, taken along the line 27—27 of FIG. 26, further illustrating the construction of a pulse generator utilized in association with the drive shaft and motor of FIG. 26;

DESCRIPTION OF ONE SPECIFIC PREFERRED EMBODIMENT OF THE INVENTION

General Description of the Grinding Machine

Figure 1:
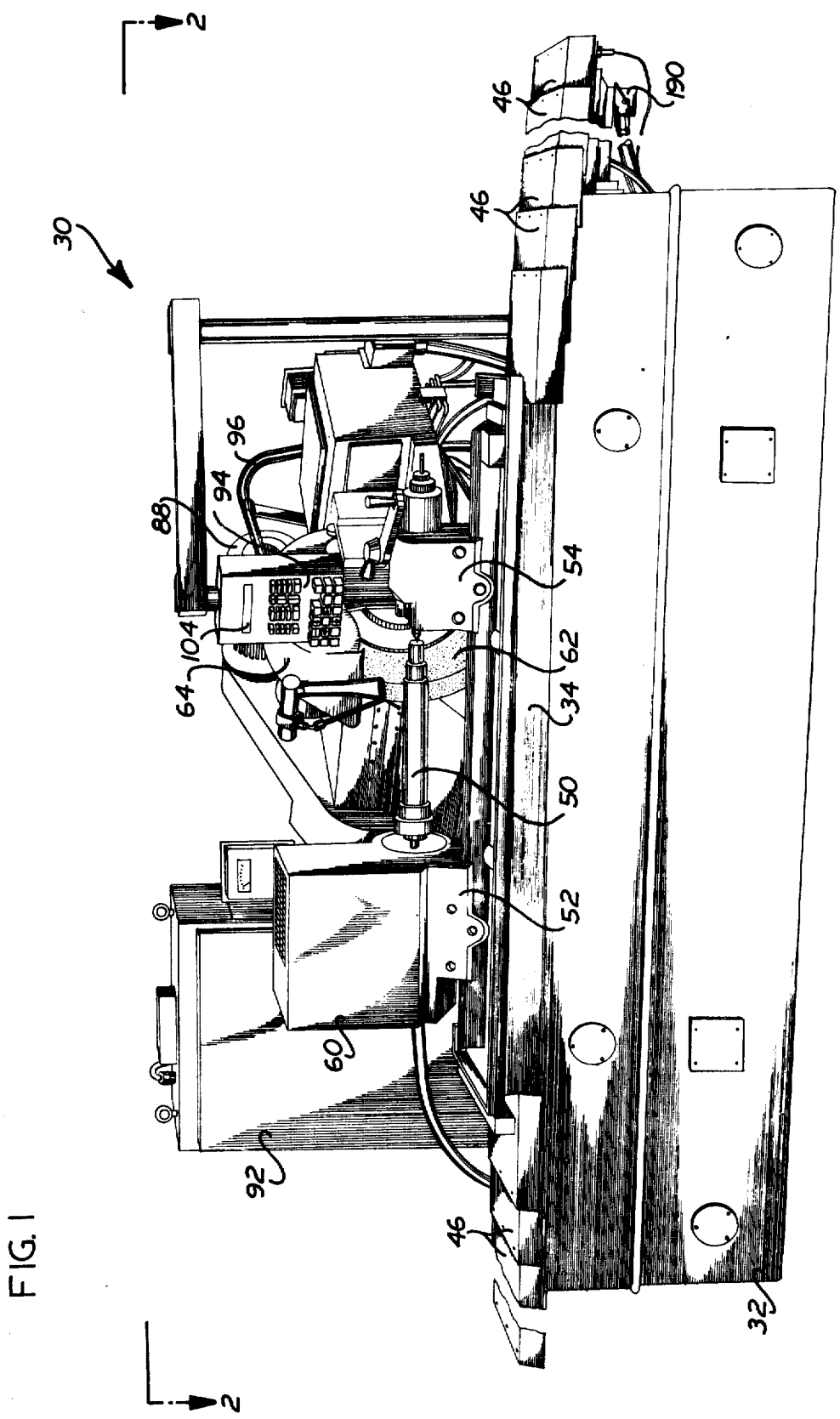
FIG. 1 is an elevational view of a grinding machine constructed in accordance with the present invention.
Figure 2:
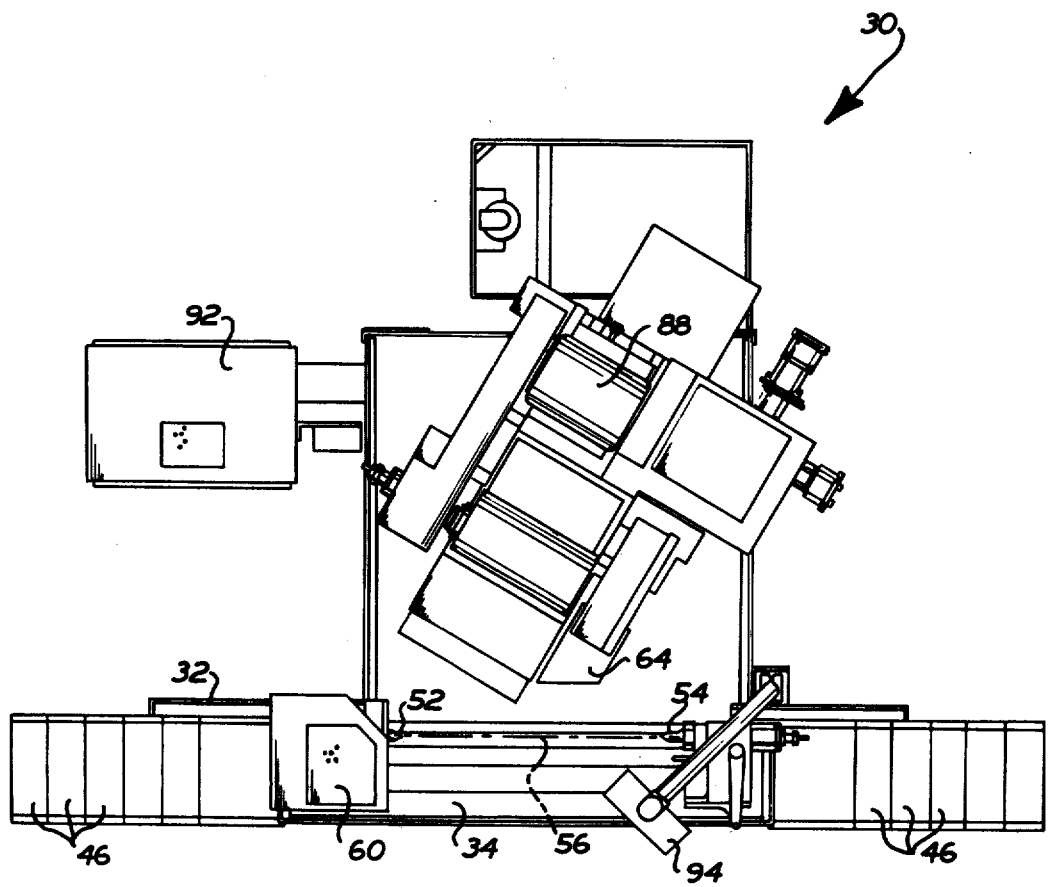
FIG. 2 is a plan view taken on a reduced scale along the line 2—2 of FIG. 1 to further illustrate the construction of the grinding machine.
Figure 3:
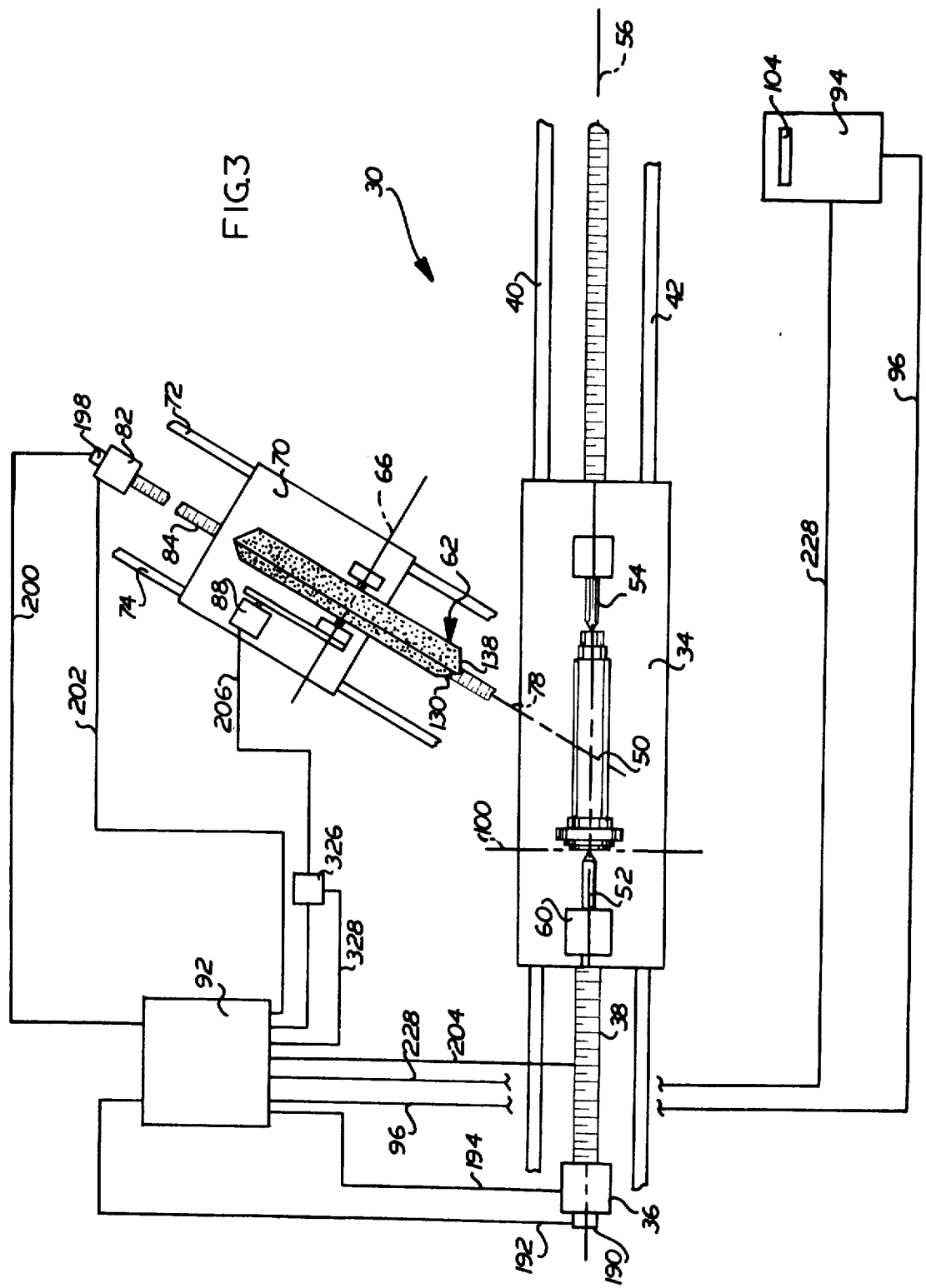
FIG. 3 is a schematic illustration depicting the relationship between a grinding wheel, workpiece and controls of the machine of FIG. 1.

A grinding machine 30 constructed in accordance with the present invention is illustrated in FIGS. 1 through 3. The grinding machine 30 includes a base 32 (FIG. 1) upon which a movable workpiece carriage or table 34 is mounted. A drive motor 36 (FIG. 3) is operable to rotate a drive screw 38 to effect movement of the carriage 34 along a pair of parallel tracks 40 and 42 mounted on the base 32. The drive screw 38 and the tracks 40 and 42 are enclosed by way guards 46 (FIGS. 1 and 2) which are telescopically movable relative to each other to accommodate movement of the carriage 34 relative to the base 32.

A workpiece 50 (see FIG. 1) is rotatably supported on the carriage 34 by a headstock 52 and a tailstock 54. The workpiece 50 is supported by the head and tail stocks 52 and 54 for rotation about a central axis 56 of the workpiece which is coincident with an axis referred to hereinafter as the Z-axis. The axis of rotation 56 of the workpiece 50 extends parallel to the drive screw 38 and the longitudinally extending tracks 40 and 42 (see FIG. 3). Therefore, upon operation of the drive motor 36 to rotate the screw 38, the carriage 34 is moved along the tracks 40 and 42 to move the workpiece 50 along its axis of rotation.

A workpiece drive motor 60 is connected with the headstock 52 and is effective to rotate the workpiece 50 about the axis 56. It should be noted that the headstock 52, tailstock 54 and drive motor 60 are all mounted on the carriage 34 and are moved along the drive tracks 40 and 42 upon operation of the motor 36 to rotate the carriage drive screw 38. The carriage drive screw 38 is connectd with the carriage 34 by suitable nut assemblies which engage the threads on the drive screw.

A circular grinding wheel 42 (see FIGS. 1 and 3) is enclosed by a wheel guard 64 and is supported for rotation about an axis 66 which extends at an acute angle to the axis of rotation 56 of the workpiece 50 (see FIG. 3). In the specific embodiment of the invention illustrated in the drawings, the grinding wheel axis of rotation 66 extends at an angle of 30 degrees to the axis of rotation 56 of the workpiece 50 and is disposed in the same horizontal plane as the axis 56. However, it is contemplated that under certain circumstances it may be desirable to mount the grinding wheel 62 for rotation about an axis which extends at a different angle to the axis of rotation of the workpiece and which may be vertically offset from the axis of rotation of the workpiece.

The grinding wheel 62 is rotatably mounted on a carriage 70 which is movable toward and away from the workpiece 50 along parallel guide tracks 72 and 74 which extend at an acute angle to the axis of rotation of the workpiece. In the illustrated embodiment of the invention, the guide tracks 72 and 74 support the carriage 70 and grinding wheel 62 for movement along a path having a central axis 78 extnding at an acute angle of 60 degrees to the axis 56 about which the workpiece 50 rotates. To effect movement of the grinding wheel 62 toward and away from the workpiece 50, a drive motor 82 rotates a screw 84 which is connected with a carriage 70 by suitable nut assemblies. The drive screw 84 extends parallel to the tracks 72 and 74 and to the path of movement of the grinding wheel 62. As the grinding wheel 62 is moved toward and away from the workpiece 50, a grinding wheel drive motor 88 mounted on the carriage 70 rotates the grinding wheel about the central axis 66.

A computer 92 (FIG. 3) is provided to control the operation of the grinding machine 30. The computer 92 is connected with an input control panel 94 by the cable 96 (see FIGS. 1 and 3). The terminal 94 is a control station from which data is transmitted to the memory registers in the computer 92. The data which is transmitted to the memory registers includes the register address, numeric data and a command to execute.

The computer registers are addressed by means of prefix keys and numeric data relating to the grinding of a particular workpiece is entered by means of manually actuated push button numeral keys at the control terminal 94. When the data relating to the grinding of a particular workpiece has been entered into the computer 92, the controls 94 are actuated to cause operation of the machine through a single cycle one step at a time. This allows the set up to be checked and permits optimizing of the cycle time. Upon completion of the single cycle, the machine 30 is switched to automatic cycle and as many parts as desired can be ground to exactly the same shape.

The control terminal 94 has keys for entry of 10 sets of data with each set containing 21 entries. Of the 21 entries, ten are positions, nine are rates and two are instructions. The two instruction entries include a diameter number. This instruction entry identifies a number of the grind and may be thought of as the number of pages in a memory book. The second instruction is the last diameter instruction which tells the computer whether there are additional grinds to follow.

The ten position entries which are transmitted to the computer 92 from the control panel 94 relate to the position of the wheel slide 70 and to the position of the workpiece carriage or table 34. The six wheel slide position entries include a clear point position entry which corresponds to the retracted position of the wheel slide from which a rapid traverse movement is started. A fast position entry indicates the point at which rapid traverse stops and fast feed of the wheel slide begins. An auxiliary position entry relates to auxiliary devices, such as the follow up steady rest, or automatically applied apparatus which are utilized in the process of grinding. A medium position entry is to indicate the position at which the fast feed of the wheel will stop and at which a medium feed rate is undertaken for the grinding wheel. The slow position entry indicates the position of the grinding wheel when medium feed stops and a slow feed of the grinding wheel is initiated. Finally, a diameter position entry indicates the position at which the in-feed of the wheel is stopped.

In addition to the foregoing wheel slide position keys, the control panel 94 has manually actuatable keys for table position entries. These include a left diameter position entry which is the amount of the wheel slide will feed (pick) when the wheel is at the left side of the grind when traverse grinding. A right diameter position entry is the amount the wheel slide will feed (pick) forward when the wheel is at the right side of the grind when traverse grinding. A left position entry indicates the position of the table when the wheel slide picks forward and, after a dwell, the movement of the carriage 34 is reversed. This occurs when the grinding wheel 62 is at the left edge of the grind. A right position entry is the position of the carriage 34 when the wheel slide picks forward and, after a dwell, the direction of movement of the carriage 34 reverses. This occurs when the grinding wheel 62 is at the right edge of the grind.

All wheel slide position entries are positive since the grinding wheel 62 is always to one side of the axis of rotation of the workpiece, that is above as viewed in FIG. 3. All of the table or workpiece carriage position entries are preceded by a sign. This is required since on some parts the zero position along the Z-axis, that is the location where the Z-axis is intersected by an X-axis 100 which is perpendicular to the Z-axis (see FIG. 4), may be established somewhere else than the extreme left end of the workpiece. Positions to the left of the intersection of the X-axis 100 with the X-axis 56 are minus while the positions to the right of the intersection are plus. It should be noted that the location of the X-axis 100 is fixed relative to the carriage 34 and that the intersection of the X-axis 100 with the Z-axis moves along the guide tracks 40 and 42 relative to the base of the machine with the carriage 34. Therefore the point of intersection of the central axis 78 of the path of movement of the grinding wheel 62 (see FIG. 3) with the Z-axis shifts along the Z-axis 56 as the carriage 34 is moved along the guide tracks 40 and 42.

Of the nine rate entries which are entered at the control panel 94, four pertain to wheel slide feed rates, four to feed rates of the table and one to work speed. The wheel slide rates include a fast rate which is an "approach" feed rate and is used for stock removal only in special cases. A medium feed rate for the grinding wheel slide is used during the removing of the major portion of material from the workpiece during a grinding operation. Finally, the slow feed rate allows the grinding pressure to be reduced to a low level prior to going into a final dwell. A constant diameter rate is utilized during the dwell and is not entered in terms of diametrical inches per minute of wheel feed. It is an in-feed rate of zero. When plunge grinding it is entered in seconds, when traverse grinding it is entered in "dead passes" (table reversals without feed). Extremely small amounts of material will normally be removed during this dwell.

The two feed rates which relate to the workpiece carriage or table 34 relate to the speed at which the table is moved along the Z-axis 56. The left rate is the rate which the table moves toward the right (as viewed in FIG. 3) and indicates the speed at which the grinding wheel 62 approaches the left end (as viewed in FIG. 2) of the workpiece 50. A right rate is the rate which the table or carriage 34 moves toward the left (as viewed in FIG. 3) and indicates the speed at which the grinding wheel 62 approaches the right end (as viewed in FIG. 3) of the workpiece 50. In addition to the foregoing two rate entries there are two other rate entries which are associated with the carriage 34. These rate entries are not entered in terms of linear inches per minute but rather are entered in terms of seconds which correspond to dwell times. A left diameter rate is the time at which the table dwells and the wheel 62 is at the left end of the grind and the table or carriage 34 is at the extreme right end of the traverse. Similarly, a right diameter rate is the time which the table dwells and the wheel 62 is at the right end of the grind and the table or carriage 34 is at the extreme left of its traverse. The dwell times are entered in seconds to allow the wheel to grind the ends of the side surfaces and improve the workpiece straightness.

In addition to the foregoing, the control panel 94 is also provided with manually actuatable enter and recall keys. The enter key is actuated to effect the writing of numeric data over any data which is already in the memory register of the computer 92 and recall key will cause a display of numeric data at a display section 104 of the panel 94 (see FIGS. 1 and 3).

In order to provide for the acceptance of numeric data associated with the various instructions, manually actuatable numeric keys corresponding to the numerals zero through nine are provided on the control panel 94 and are manually actuated after the instruction keys have been actuated. The numeric data entered on the control panel 94 is displayed at 104.

Locating a Workpiece

Prior to initiating a grinding operation, it is necessary to locate the workpiece 50 in a predetermined axial position relative to the X-axis 100. This has previously been done by shifting the workpiece along the Z-axis 56 until a preselected reference surface is precisely positioned in a reference plane. Of course, if the workpiece is not located with the reference surface exactly in the reference plane, the workpiece will not be properly located relative to the X-axis 100 and this can result in errors during the grinding operation.

To facilitate locating the workpiece, the necessity of locating the reference surface of the workpiece exactly in a reference plane is eliminated. In accordance with the present invention, the reference surface on the workpiece needs only to be located closely adjacent to the reference plane. A probe assembly 108 (FIG. 4) provides an output signal with a magnitude which varies as a function of the distance which a reference surface 110 on the workpiece 50 is offset from a reference plane 112. The reference plane 112 extends parallel to the X-axis 100 and perpendicular to the Z-axis 56. Although the reference plane 112 has been illustrated in FIG. 4 as being offset to the right of the X-axis 100, the reference plane 112 could be offset to the left of the X-axis 100 or coincident with the X-axis.

The probe assembly 108 includes a probe member 116 which is pivotally mounted on the carriage 34 at a pivot connection 118. The probe member 116 has an end portion or pointer 120 which engages the annular reference surface 110 and an opposite end portion 122 which cooperates with the resistance coil 124 of a potentiometer. Of course, other types of transducers could be utilized if desired.

Figure 4:
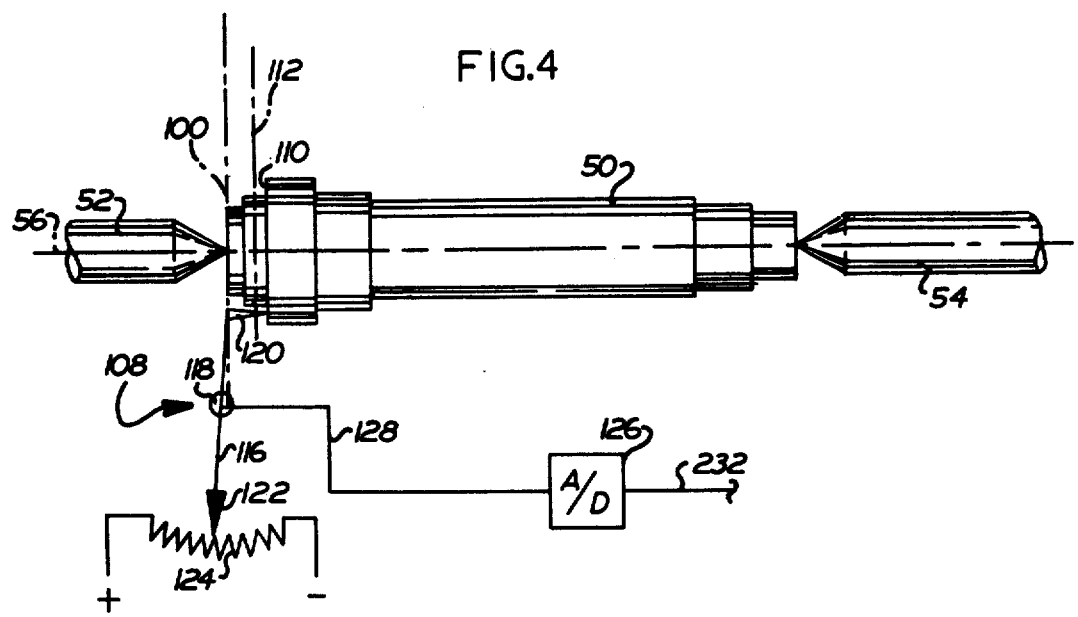
FIG. 4 is a schematic illustration depicting the determination of the distance which a reference surface is offset from a predetermined reference plane.

When the reference surface 110 is exactly aligned with the reference plane 112, a zero voltage output signal is applied over a lead 128 to an analog to digital converter 126. For this zero voltage signal corresponding to a position in which the reference surface 110 is exactly aligned to the reference plane 112, the analog to digital converter 126 has a corresponding zero output signal. If the reference surface 110 is offset from the reference plane 112 as shown in FIG. 4, the output voltage to the analog to digital converter 126 is of a positive magnitude corresponding to the distance which the reference surface 110 is offset from the plane 112. The output from the analog to digital converter 126 is a multi-bit binary number having a positive sense and a magnitude corresponding to the distance which the reference surface 110 is offset to the right of the reference plane 112. Similarly, if the reference surface 110 is offset to the left of the reference plane 112, the output voltage from the probe assembly 108 to the analog to digital converter 126 is of a negative magnitude corresponding to the distance which the surface 110 is offset to the left. The output from the analog to digital converter 126 is then a multi-bit binary number having a negative sense and a magnitude corresponding to the distance which the reference surface 110 is offset to the left of the reference plane 112.

The output signals from the analog to digital converter 126 are transmitted to a register which stores data corresponding to the position of an annular edge surface 130 of the grinding wheel 62 (see FIGS. 3 and 4) relative to the X-axis 100. If the reference surface 110 is located to the right of the reference plane 112, the output signal from the analog digital converter 126 effects a decrease in the data stored in the position register to thereby indicate that the annular edge surface 130 of the grinding wheel is effectively closer than it should be to the X-axis 100 due to the fact that the workpiece 50 is offset to the right of the reference location. If the reference surface 110 is offset to the left (as viewed in FIG. 4) of the reference plane 112, the output from the analog to digital converter 126 causes the data stored in the register to indicate that the edge surface 130 of the grinding wheel 62 is spaced further from the axis 100 to thereby compensate for the offsetting of the reference surface 110 to the left of the reference plane 112.

Although the use of the probe assembly 108 is disclosed herein in association with a grinding machine having a wheel 62 which moves along a path extending at an acute angle to the X-axis 100, it is contemplated that reference surfaces on workpieces could be located in a similar manner in association with a grinding machine having a wheel which moves along a path extending perpendicular to the Z-axis 56, that is along a path extending parallel to the X-axis 100. It should also be understood that although the probe assembly 108 is particularly advantageous, other known probe assemblies could be utilized in association with the grinding machine 30 to locate a workpiece. In addition, it is contemplated that the reference surface could face away from the X-axis rather than toward the X-axis as shown in FIG. 4.

Grinding of Successive Shoulders on a Workpiece

The manner in which shoulders and side portions of different diameters are ground with the machine 30 is illustrated schematically in FIGS. 5 through 10. At the beginning of a grinding operation, the grinding wheel 62 is in a retracted position spaced a substantial distance apart from the workpiece 50. The workpiece 50 has been positioned along the axis of rotation 56 by the probe assembly 108 in the manner previously described.

To initiate a grinding operation, the grinding wheel 62 is moved inwardly at rapid traverse speed by motor 82 along the path extending at an acute angle to the axis of rotation of the workpiece 50 until a point just ahead of the preprogrammed fast feed point is reached. The grinding wheel is then moved inwardly at a reduced speed. When a preprogrammed medium speed point is reached the grinding wheel feed rate is still further reduced to a medium or grinding feed speed.

The grinding wheel 62 continues to move inwardly toward the workpiece at the reduced speed and the annular edge surface 130 on the grinding wheel engages a radially extending annular shoulder 134 on the workpiece in the manner shown in FIG. 6. At this time the annular face surface 138 on the grinding wheel 62 engages a cylindrical side 140 of the workpiece. It should be noted that as the grinding wheel moves inwardly from the position shown in FIG. 5 to the position shown in FIG. 6 the grinding wheel is continuously rotated by the grinding wheel drive motor 88 and the workpiece 50 is continuously rotated about the axis 56 by the drive motor 60 (see FIG.3.).

Once the grinding wheel has engaged the shoulder 134 and side surface 140, it is moved inwardly through a predetermined distance to grind the shoulder 134 so that its radially extending side surface is located in a predetermined position relative to the Z-axis 56. Simultaneously with the grinding of the shoulder 134 by the edge surface 130 of the grinding wheel 62, the surface 138 of the grinding wheel 62 is effective to grind the side 140 of the workpiece 50 to a desired diameter. Since the side 140 of the workpiece 50 extends perpendicular to the shoulder 134, the side and shoulder can be simultaneously ground by the perpendicular face and edge surfaces 138 and 130 of the grinding wheel 62.

Once the shoulder 134 and side 140 of the workpiece have been ground, the grinding wheel 62 is moved away from the workpiece 50 under the influence of the drive motor 82 to a preprogrammed clear point position illustrated in FIG. 7. At the clear point position the face surface 138 of the grinding wheel 62 is disposed a predetermined distance outwardly of the next succeeding side 144 of the workpiece (see FIG. 7). At this time, the distance between the cylindrical outer surface of the side 144 and the Z-axis 56 is less than the distance from the Z-axis 56 to the closet point on the face surface 138 of the grinding wheel 62.

After the continuously rotating grinding wheel 62 has been moved to this first clear point position, the continuously rotating workpiece 50 is moved rightwardly (as viewed in FIG. 8) along its axis of rotation 56 until the edge surface 130 of the grinding wheel 62 is in a predetermined position relative to a radially extending shoulder surface 146. The grinding wheel 62 is moved inwardly through a plunge grind stroke from the clear point position of FIG. 8 to the position shown in FIG. 9. As the rotating grinding wheel 62 is moved through the plunge grind stroke, the face surface 138 on the grinding wheel grinds the cylindrical side 144 and the edge surface 130 of the wheel grinds the radially extending annular shoulder 146.

The grinding of both the side surface 144 and the shoulder 146 is accomplished in a single plunge stroke of the grinding wheel 62. This occurs because the rotating workpiece 50 is first accurately positioned along its axis of rotation 56 with the edge surface 130 of the grinding wheel 62 offset to the right of the shoulder 146 in the manner illustrated schematically in FIG. 8. The grinding wheel 62 is then moved inwardly along a path extending at an acute angle to the Z-axis so that the edge surface 130 which extends perpendicular to the face surface 138 is effective to grind the shoulder 146. Similarly, the face surface 138 which extends parallel to the Z-axis 56 is effective to grind the side surface 144.

The grinding wheel 62 is then moved away from the Z axis 56 from the end of grind position shown in FIG. 9 to a second preprogrammed clear point position shown in FIG. 10. When the grinding wheel is at the second clear point position (FIG. 10), the face surface 138 of the grinding wheel is disposed outwardly of the shoulder 146. It should be noted that at this time the grinding wheel 62 is spaced further from the Z-axis than it was at the first clear point position shown in FIG. 8. This is because the shoulder 146 has a large maximum diameter than does the shoulder 134.

By using clear point positions located outwardly from the Z-axis by a distance which is slightly greater than the maximum diameter of the next succeeding diameter to be ground, excessive movements of the grinding wheel 62 are avoided. Thus, when the grinding wheel 62 is moved to the clear point position of FIG. 7 it is spaced outwardly from the Z-axis by a distance which is smaller than the distance which the grinding wheel is spaced outwardly from the Z-axis when it is in the second clear point position shown in FIG. 10. The different clearpoint positions can be manually programmed from the control panel 94. However, in the event that the operator chooses not to or fails to program the next succeeding clear point position, the computer 92 searches its memory to determine the dimension of the next succeeding diameter and automatically effects movement of the grinding wheel 62 to a clear point position located a predetermined distance outwardly from the maximum dimension of the next succeeding diameter. This prevents interference of the grinding wheel 62 with the workpiece 50 upon axial movement of the workpiece in the manner illustrated schematically in FIG. 8.

Figure 19:
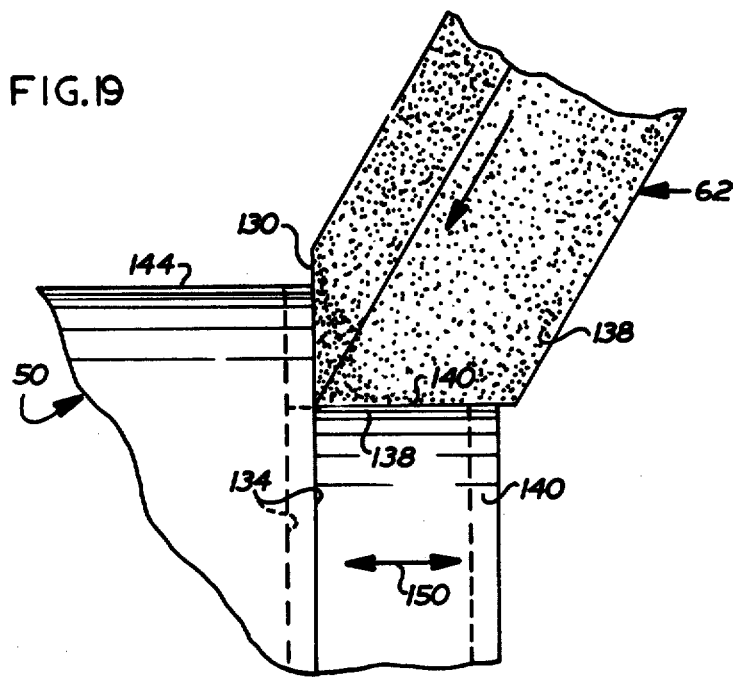
FIG. 19 (on sheet 4 of the drawings) is an enlarged illustration depicting the manner in which the workpiece is moved axially during the grinding of a radially extending shoulder and a relatively short side surface of a workpiece.

In order to provide very smooth side surfaces 140 and 144, the rotating workpiece 50 can be reciprocated along its axis of rotation during the plunge grind operation. The manner in which the workpiece 50 is reciprocated during the grinding of the side surface 140 is illustrated schematically in FIG. 19. Thus, as the rotating grinding wheel 62 moves inwardly along the path extending at an acute angle to the Z-axis 56, the workpiece 50 is reciprocated back and forth along its axis of rotation in the manner illustrated schematically by the arrow 150 in FIG. 19. The end of a stroke of the workpiece toward the right (as viewed in FIG. 19), always occurs with the workpiece 50 in the same position relative to the wheel edge surface 130 and base 32 of the machine 30. When the workpiece 50 is in this end of stroke position, a plane in which the finish ground shoulder surface 134 is to be located abuts a plane in which the edge surface 130 of the grinding wheel 62 is to be located at an end of wheel feed position.

By reciprocating the workpiece 50 along its axis of rotation in this manner as the grinding wheel 62 is moved inwardly, the rotating side surface 140 is moved axially relative to the face surface 138 of the grinding wheel to thereby provide an exceedingly smooth side surface. It should be noted that if it is attempted to reciprocate the grinding wheel 62 along its axis of rotation, that is along the axis 66 of FIG. 3, the side surface 140 would not be finished to the desired diameter. This is because the axis of rotation 66 of the grinding wheel 62 extends at an acute angle to the Z-axis 56. It should also be noted that although the reciprocating movement of the workpiece 50 has been illustrated herein in FIG. 19 in association with the side 140, the side 144 can be reciprocated relative to the grinding wheel 62 in the same manner to provide for a smooth surface.

The workpiece 50 is advantageously reciprocated during a plunge grinding operation by the same drive arrangement utilized to initially position the workpiece 50 along its axis of rotation. Thus, the motor 36 is operated in a first direction to rotate the drive screw 38 and move the workpiece 50 and carriage 34 toward the left (as viewed in FIG. 3). The direction of operation of the motor 36 is then reversed and the workpiece is moved back toward the right through the same distance which it was previously moved toward the left. By using the same motor 36 to perform the dual functions of positioning the workpiece relative to the grinding wheel and reciprocating the workpiece, the construction of the grinding machine 30 is simplified.

Traverse Grinding an Axially Extending Side Surface and a Shoulder of the Workpiece After the shoulders 134 and 146 and associated sides 140 and 144 of the workpiece 50 have been ground in the manner illustrated schematically in FIGS. 5 through 9, the grinding wheel 62 moves to the second clear point position (FIG. 10) outwardly of the shoulder 146. The rotating workpiece 50 is moved toward the right along its axis of rotation in the manner illustrated schematically in FIG. 11. This axial movement of the workpiece 50 is interrupted when the shoulder 146 is located adjacent the face surface 138 of the rotating grinding wheel 162.

The rotating grinding wheel 62 is then moved inwardly so that the face surface 138 on the grinding wheel engages a longitudinally extending cylindrical side 154 of the workpiece 50 in the manner illustrated in FIG. 11. The rotating workpiece 50 is then moved rightwardly relative to the grinding wheel 62 from the position shown in FIG. 11 to the position shown in FIG. 12. During this rightward movement of the workpiece 50 along its axis of rotation, the face surface of the grinding wheel 62 is effective to traverse grind the cylindrical side 154 of the rotating workpiece.

At the end of the traverse grind stroke of the workpiece 50, the edge surface 130 of the grinding wheel 62 engages a radially extending shoulder 158 of the workpiece 50. At the completion of the rightward movement of the workpiece 50 relative to the grinding wheel 62, the edge surface 130 of the grinding wheel 62 is effective to grind a radially outer portion 162 of the shoulder 158 (see FIG. 20) to a desired axial position. It should be noted that as the radially outer portion 162 (see FIG. 20) of the shoulder 158 is being ground to the desired finish by the edge surface 130 of the grinding wheel 62, the face surface 138 of the grinding wheel is removing material from the workpiece 50 up to the shoulder 158.

Figure 20:
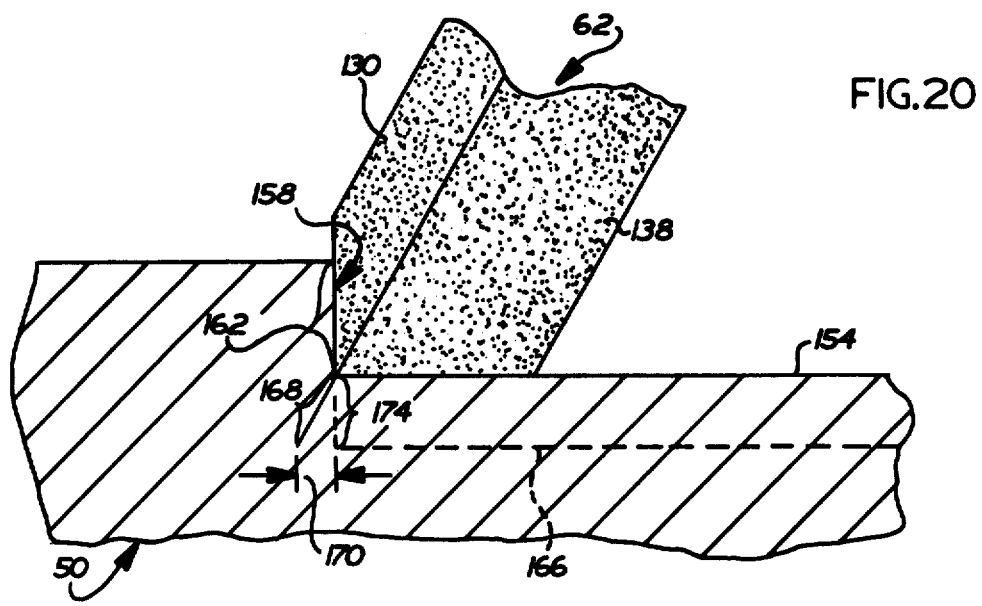
FIG. 20 is a schematic illustration depicting the manner in which a workpiece is moved axially to compensate for movement of the grinding wheel along a path extending at an acute angle to the axis of rotation of the workpiece.

In order to grind the side 154 of the workpiece 50 to the desired depth, it is necessary for the grinding wheel 62 to move inwardly toward the Z-axis 56 from the position shown in FIGS. 12 and 20. Thus, if the side 154 of the workpiece 50 is to be ground to a depth indicated in dashed lines at 166 in FIG. 20, the grinding wheel 62 will have to be moved inwardly along a path extending at an acute angle to the Z-axis through a distance indicated at 168 in FIG. 20. It should be noted that the magnitude of the distance 168 has been exaggerated in FIG. 20 for purposes of clarity of illustration.

Moving the grinding wheel 62 inwardly toward the Z-axis through the distance 168 (FIG. 20) results in the edge surface 130 of the grinding wheel being moved inwardly and leftwardly from the position shown in FIG. 20. As the edge surface 130 of the grinding wheel moves inwardly, it moves leftwardly through a distance indicated at 170 in FIG. 20. If the position of the workpiece is maintained the same as shown in FIG. 20 as the grinding wheel 62 moves inwardly, the shoulder 158 would be displaced leftwardly from the desired position of FIG. 20 by the surface 130 of the grinding wheel. This unwanted displacement of the annular shoulder 158 would result from the fact that the grinding wheel 62 is moved along a path extending at an acute angle to the Z-axis 56. Therefore, the edge surface 130 of the grinding wheel 62 would move toward the left (as viewed in FIG. 20) as the grinding wheel 62 moved inwardly along the path.

In accordance with a feature of the present invention, the workpiece 50 is moved to compensate for the extent to which the edge surface 130 is moved toward the left (as viewed in FIG. 20) as the grinding wheel 62 moves from the position shown in solid lines in FIG. 20 to the depth indicated in dashed lines at 166 in FIG. 20. To compensate for the leftward movement of the edge surface 130 of the grinding wheel 62, the workpiece 50 is moved leftwardly through a distance equal to the distance 170 before the grinding wheel 62 is moved inwardly toward the Z-axis.

Figure 21:
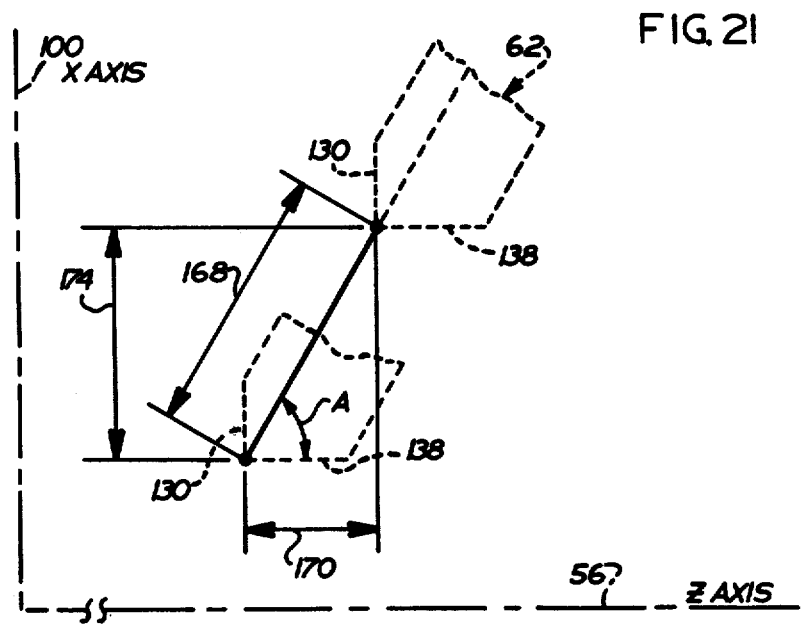
FIG. 21 is a line sketch, similar to FIG. 20 further illustrating the manner in which the grinding wheel moves along a path extending at an acute angle to the axis of rotation of the workpiece.

This leftward movement of the workpiece results in the edge surface 130 of the grinding wheel 62 being spaced apart from the shoulder 158 by the distance 170 before the grinding wheel 62 is moved inwardly through the distance indicated at 168 in FIGS. 20 and 21. Therefore as the grinding wheel 62 is fed inwardly through the distance 168, the edge surface 130 on the grinding wheel moves back to the same plane shown in FIG. 20 but at a radially inwardly offset location relative to the side surface 154. As the rotating grinding wheel 62 moves through the distance 168, a radially inner portion 174 (see FIG. 20) of the rotating shoulder 158 is ground to form a continuation of the previously ground radially outer portion 162 of the shoulder surface 158.

As the grinding wheel 62 moves inwardly through the distance 168 measured along the path of movement of the grinding wheel, the face surface 138 of the grinding wheel 62 moves toward the Z-axis 56 through a distance which is equal to the distance 168 times the sine of the angle indicated at A in FIG. 21 between the path of movement of the grinding wheel and the Z-axis. This distance has been indicated at 174 in FIG. 21. Simultaneously therewith, the edge surface 130 of the grinding wheel moves toward the X-axis 100 (see FIG. 3) through a distance equal to the cosine of the angle A times the distance 168 through which the grinding wheel moves along its path of movement. This distance has been indicated at 170 in FIG. 21. Since the workpiece 50 was first retracted toward the left through the distance 170 before the grinding wheel was moved inwardly, the shoulder 158 is not displaced axially during the inward movement of the grinding wheel. In the absence of this leftward shifting movement of the workpiece 50, the shoulder 158 would be cut away by an amount corresponding to the distance 170.

When the grinding wheel 62 has been moved inwardly so that the face surface 138 is in alignment with the dashed line 166 of FIG. 20 and the edge surface 130 of the grinding wheel is in engagement with the radially inner portion 174 and the radial outer portion 162 of the shoulder 158, the workpiece 50 is moved leftwardly from the position shown in FIG. 12 to the position shown in FIG. 13 to effect a second traverse grinding of the side 154 of the workpiece. It should be noted that the distance 174 has been exaggerated for purposes of clarity of illustration. Upon completion of this traverse grind stoke, the grinding wheel 62 is again moved inwardly toward the Z-axis 56. The rotating workpiece 50 is then moved axially relative to the grinding wheel 62 in the manner shown in FIG. 14 to effect a third traverse grind stroke. Traverse grind strokes are repeated until the side 154 of the workpiece and the shoulder 158 is ground to the desired dimension end finish. The grinding wheel 62 is then moved away from the Z-axis 56 to a preprogrammed clear point position illustrated in FIG. 15. It should be noted that when the grinding wheel 62 is in this clear point position, it is disposed outwardly of the clear point position of FIG. 10 and outwardly from the next succeeding cylindrical side 180 of the workpiece 50.

While the grinding wheel 62 is maintained in the clear point position of FIG. 15, the workpiece 50 is moved toward the right to align the grinding wheel with the side 180 and a radially extending shoulder 184. The grinding wheel 62 is then moved inwardly through a plunge grind stroke in the manner previously explained in connection with the side 140 and shoulder 134 to simultaneously grind both the side 180 and shoulder 184. During the plunge grind stroke the workpiece 50 can be reciprocating along its axis of rotation to promote the formation of a smooth finish on the side 180.

After the side 180 and shoulder 184 have been finished, the grinding wheel 62 is retracted to a clear point position and the final cylindrical side surface 186 is ground in the manner illustrated schematically in FIG. 17. The grinding wheel 62 is then moved to the retracted position of FIG. 18 and the table 34 is returned to the first grinding position for removal of the finished workpiece 62 from the grinding machine 30.

During the grinding of the workpiece 50, the grinding wheel 62 and the workpiece are moved relative to each other through either plunge grind stokes in the manner shown schematically in FIGS. 6 through 9 or through traverse grind strokes in a manner illustrated schematically in FIGS. 12 through 14. However, it is contemplated that on certain workpieces it may be desirable to effect a combination of plunge and traverse grinding operations in the finishing of a single shoulder and axially extending side portion of the workpiece. This would be the case when the shoulder has a relatively large radial dimension so that it cannot be finished by traverse grinding the side of the workpiece and finishing the shoulder at the end of the traverse grind strokes.

In the case of a shoulder having a relatively large radial extent, the grinding wheel 62 would be moved through a plunge grind stroke to finish a radially outer portion of the shoulder. The grinding wheel 62 would then be moved inwardly to grind a portion of the side surface adjacent to the shoulder and to grind a radially inner portion of the shoulder. The workpiece would then be moved axially relative to the grinding wheel to effect a traverse grind stroke with the face surface 138 of the grinding wheel. The traverse grind strokes would be repeated in the manner previously discussed in connection with the side 154 of the workpiece 50.

At the end of the traverse grind strokes when the grinding wheel is adjacent to the radially extending shoulder surface, it will be necessary to move the workpiece axially to shift the shoulder away from the grinding wheel. The grinding wheel is then moved inwardly towards the axis of rotation of the workpiece and the edge surface 130 on the grinding wheel finishes a radially inner portion of the shoulder. Thus, the shoulder would be moved away from the edge surface 130 of the grinding wheel by a distance equal to the radial distance which the grinding wheel 62 is to be moved inwardly toward the Z-axis 56, as measured parallel to the X-axis 100, times the cotangent of the angle which the path of movement of the grinding wheel makes with the Z-axis 56 about which the workpiece is rotated. This results in the edge surface 130 of the grinding wheel being located in the same plane at the end of the inward movement of the grinding wheel as in which the edge surface 130 would be located at the end of a traverse grind operation of the wheel 62.

It is contemplated that under certain circumstances it may be desired to compensate for the extent to which the edge surface on the grinding wheel 62 is moved toward the shoulder 158 by ending the preceding work stroke with the edge surface of the grinding wheel spaced apart from the shoulder portion of the workpiece by the distance indicated at 170 in FIG. 20. The manner in which movement of the edge surface 130 toward the shoulder portion is compensated for by ending a work stroke short of the shoulder is illustrated schematically in FIG. 29.

Figure 29:
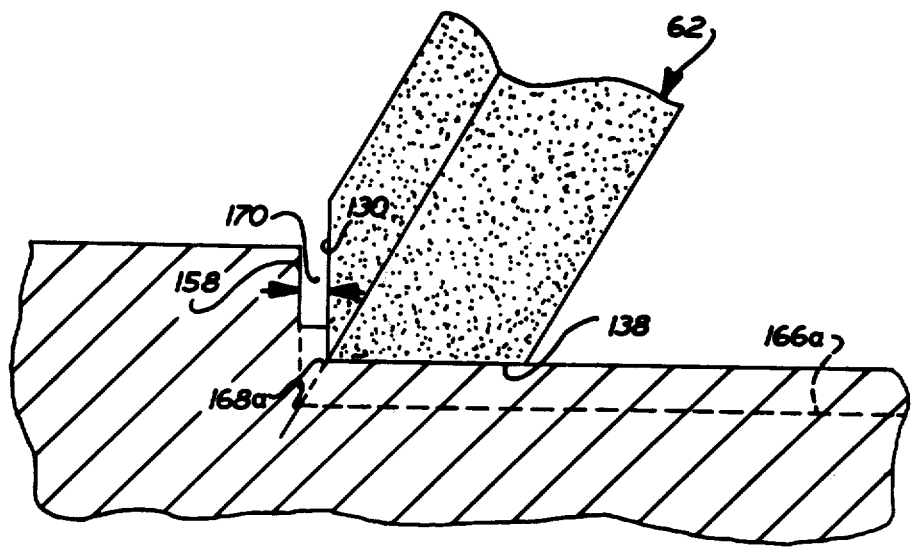
FIG. 29 is a schematic illustration depicting an alternative manner of compensating for movement of the grinding wheel along a path extending at an acute angle to the axis of rotation of the workpiece.

The grinding wheel 62 is shown in FIG. 29 at the end of a work stroke in which the workpiece has been moved toward the right from the position shown in FIG. 11 toward the end of stroke position shown in FIG. 12. Rightward movement of the workpiece is interrupted with the face surface 130 on the workpiece spaced apart from the shoulder 158 by a distance indicated at 170a in FIG. 29. The grinding wheel 62 is then moved inwardly toward the Z-axis through a distance indicated at 168a in FIG. 29. This results in the material disposed between the edge surface 130 and the radial plane of the shoulder 158 being ground away as the grinding wheel 62 moves toward the Z-axis along the path extending in an acute angle to the Z-axis.

When the edge surface 130 of the grinding wheel 62 is disposed in engagement with the radially extending shoulder surface 158, inward movement of the grinding wheel is interrupted. At this time the grinding wheel is located in a position to begin another work stroke. The face surface 138 of the grinding wheel has moved to the depth of a dashed line 166a. The next succeeding work stroke is then undertaken by moving the workpiece toward the left in the manner illustrated schematically in FIGS. 12 and 13 of the drawings.

Method of Effecting Accurate Movement Between the Grinding Wheel and Workpiece Through Small Distances During the grinding operation illustrated in FIGS. 5 through 18 it is contemplated that it may be desirable to move the grinding wheel inwardly through relatively small incremental distances toward the axis of rotation of the workpiece. This small incremental movement of the grinding wheel may be so small that entering a command at the control panel 94 to move this distance will not result in sufficient operation of the motor 82 (FIG. 3) effect the desired inward movement of the grinding wheel. If the command to move the grinding wheel inwardly is repeated, there is a very good chance that both the first and second commands will be responded to simultaneously by the grinding wheel 62. If this occurs, the grinding wheel 62 will move inwardly toward the Z-axis through a distance equal to twice the desired relatively small incremental movement of the grinding wheel.

To prevent this from happening, the grinding wheel 62 is first retracted through a relatively large distance, for example 0.005 of an inch, away from the Z-axis 56. The grinding wheel is then moved toward the Z-axis through a distance equal to the sum of the relatively large distance through which it was retracted plus the relatively small incremental distance through which the grinding wheel is to be moved inwardly toward the Z-axis 56. The net result of this initial movement of the grinding wheel away from the Z-axis through a relatively large distance and then movement of the grinding wheel toward the Z-axis through a sum of the large distance and the small incremental distance is to displace the grinding wheel inwardly toward the Z-axis through the small incremental distance.

In addition to effecting movement of the grinding wheel 62 through relatively small distances toward the Z-axis 56, it is contemplated that it will be desirable to shift the workpiece 50 axially through relatively small distances relative to the edge surface 130 of the grinding wheel. When a shoulder surface on the workpiece, for example the shoulder surface 134, is to be moved through a relatively small distance toward the edge surface 130 of the grinding wheel, the shoulder 134 is first moved through a relatively large distance in a direction away from the edge surface 130 of the grinding wheel. The shoulder is then moved toward the edge surface 130 of the grinding wheel through a distance equal to the sum of the relatively small distance and the relatively large distance which the shoulder was moved away from the side surface of the grinding wheel. This results in a net movement of the shoulder 134 toward the edge surface 130 of the grinding wheel through the desired relatively small incremental amount. Of course, if it was desired to shift the shoulder 134 a relatively small distance away from the grinding wheel, the shoulder could be moved away from the grinding wheel through a relatively large distance and then moved back toward the side surface 130 of the grinding wheel through a distance equal to the relatively large distance minus the relatively small distance.

Controls

The computer 92 (see FIG. 3) is based on a Warner & Swasey Computer Division Model No. CS-4A Micro Computer Control System. The micro computer includes a central processing unit based on an Intel No. 4040 chip which receives data from the manually actuated keyboard 94 and other interface modules. The central processing unit manipulates data in accordance with instructions, provides timing and counting functions and transmits machine function information to output interface modules.

A random access memory in the computer 92 is based on an Intel No. 5101 chip which is made nonvolatile through the use of a 30 day battery back up. This nonvolatile random access memory stores part program data for reference by the central processing unit. A random access memory is also based on an Intel 5101 chip and is utilized for the temporary storage of data. Erasable programmable read only memory units based on Intel No. 1702A Ultra-Violet Light Erasable Chips are utilized in the computer control systems resident (executive) control program. This program provides instructions to the central processing unit for manipulation of data received from input interface modules and the random access memory.

In order to provide the computer 92 with information concerning the position of the X-axis 100 relative to the edge surface 130 of the grinding wheel 62, a pulse generator 190 (FIG. 3) is driven by the motor 36 simultaneously with the drive screw 38. The output signal from the pulse generator 190 is transmitted through a lead 192 to the computer 92. The computer 92 controls the operation of the motor 36 through the lead 194.

Similarly, a pulse generator 198 (FIG. 3) is connected with the motor 82 and grinding wheel carriage drive screw 84 to provide pulses which indicate the extent of movement of the grinding wheel toward and away from the Z-axis 56. These pulses are transmitted to the computer 92 over a lead 200. Operation of the motor 82 is controlled by signals transmitted over a lead 202 (see FIG. 3).

During a grinding operation, the computer 92 transmits a signal over a lead 204 (FIG. 3) to effect continuous operation of the motor 60. The motor 60 is effective to rotate the workpiece 50 about the Z-axis 56 at preprogrammed surface speeds. Similarly, the computer 92 effects operation of the motor 88 to continuously drive the grinding wheel 62. The speed of operation of the motor 88 is varied in accordance with preprogrammed instructions in response to signals transmitted over a lead 206.

During movement of the grinding wheel 62 toward and away from the workpiece 50, the position of the edge surface 130 relative to the X-axis 100 is varied. In addition, the position of the face surface 138 of the grinding wheel relative to the Z-axis 56 is varied. As was previously mentioned, this is due to the fact that the grinding wheel is moved along a path which extends at an acute angle to the Z-axis 56. In addition, when the workpiece carriage 34 is moved along the axis of rotation of the workpiece, the position of the X-axis 100 relative to the edge surface 130 is varied.

To enable the computer 92 to keep track of the position of the edge surface 130 relative to the X-axis 100, a Z-axis register 210 (FIG. 22) is provided in the computer 92. The Z-axis register 210 is a presettable up-down counter. However, other devices could be utilized if desired. The register 210 stores data corresponding to the position of the edge surface 130 relative to the X-axis 100 as read on the Z-axis 56.

A second or X-axis register 214 is provided in the computer 92. The register 214 is also a presettable up-down counter. However, other devices could be utilized if desired. The X-axis register 214 stores data corresponding to the position of the face surface 138 relative to the Z-axis 56 as read on the X-axis 100.

The data which is stored in the Z-axis register 210 and the X-axis register 214 can be sequentially viewed at the digital readout display 104 (FIGS. 1 and 22) provided at the control panel. Thus, when the data stored in the X-axis register 210 is to be viewed at the display 104, the computer 92 effectively closes a switch 218 (FIG. 22) connected with an AND gate 220. This enables the AND gate to transmit the data stored in the Z-axis register to the display 104. Similarly, if the data stored in the X-axis register is to be transmitted to the display 104, a switch 222 (FIG. 22) is actuated by the computer 92 to enable AND gate 224 to transmit data to the display 104. The data from the active one of the two AND gates 220 or 224 is transmitted to the display 104 over a lead 228. Similar circuitry is used to selectively display any program desired.

When the workpiece 50 is initially located relative to the X-axis 100, it is contemplated that a reference surface 110 on the workpiece 50 may be offset from a reference plane 112 in the manner previously explained in connection with the probe assembly 108 shown in FIG. 4 of the drawings. Assuming that this is the case, a multi-bit binary signal is transmitted from the analog to digital converter 126 to the register 210 (FIG. 22) over a lead 232. At the time when the workpiece 50 is initially being located relative to the X-axis 100, a load switch 234 is closed (FIG. 22) and the signal from the analog to digital converter 126 is transmitted to the register 210 to preset in the register data corresponding to the distance by which the reference surface 110 is offset from the predetermined reference plane 112. In this manner the Z-axis register 210 is initially preset to compensate for the distance between the reference surface 110 and the predetermined reference plane 112.

When the motor 36 is operated to move the workpiece carriage 34 toward the right (as viewed in FIG. 3), the distance between the edge surface 130 of the grinding wheel 62 and the X-axis algebraically decreases so that the Z-axis reading decreases. At this time, the computer 92 effectively closes a switch 238 to enable an AND gate 240 to transmit pulses from the pulse generator 190 through the lead 192 to the Z-axis register 210. In addition, a count down switch 242 is closed by the computer 92 so that the pulse input from the generator 190 effectively counts the preset counter 210 down. Since the pulse generator 190 is driven by the motor 36 in synchronization with the carriage drive screw 38, the pulse signals from the pulse generator 190 are indicative of the extent of movement of the carriage 34 and workpiece 50 relative to the base 32 and grinding wheel 62. Therefore the pulses from the generator 190 effectively reduce the data stored in the counter 210 as a function of the reduction in the distance between the X-axis 100 and the edge surface 130 of the grinding wheel 62.

Similarly, when the motor 36 is operated to move the workpiece carriage 34 toward the left (as viewed in FIG. 3), the distance between the X-axis 100 and the edge surface 130 of the grinding wheel 62 increases. At this time a count up switch 246 is closed and the pulses from the pulse generator 190 are terminated through the enabled AND gate 240 to count up the register 210. Therefore, the data stored in the register 210 is increased to correspond with the increase in the distance between the X-axis and the edge surface 130 of the grinding wheel 62 during movement of the workpiece carriage 34 away from the grinding wheel.

When the motor 82 is operated to move the grinding wheel 62 toward the workpiece, the distance between the edge surface 130 and the X-axis 100 is reduced as a function of the cosine of the angle which the path of movement of the grinding wheel 62 makes with the Z-axis 56. Therefore, the output from the pulse generator 198 is transmitted through a multiplier 250 (see FIG. 22) before being transmitted through to the Z-axis register 210. The multiplier 250 reduces the number of pulses transmitted to an AND gate 252 which is enabled at this time by closing of a switch 254 by the computer 92. Therefore, the number of pulses transmitted to the Z-axis register 210 is equal to the number of pulses initially provided by the pulse generator 198 times the cosine of the angle which the path of movement of the grinding wheel 62 makes with the Z-axis 56, that is the cosine of 60 degrees in the illustrated embodiment of the invention. Since the griding wheel 62 is being moved toward the workpiece and the down count switch 242 is closed, the pulses are effective to count down the counter 210 as the edge surface 130 moves toward the X-axis 100.

If the grinding wheel 62 is moved away from the Z-axis 56, the distance between the edge surface 130 and X-axis 100 increases. Therefore, the count up switch 246 is closed so that the pulses transmitted from the pulse generator 198 to the multiplier 250 and and gate 252 effect a counting up of the data stored in the register 210. Thus, the data stored in the register 210 is varied as a function of a cosine of the angle of the path of movement of the grinding wheel relative to the Z-axis as the grinding wheel is moved either toward or away from the workpiece.

The distance between the face surface 138 and the Z-axis is read on the X-axis 100. This distance is only varied when the grinding wheel 62 is moved toward or away from the Z-axis 56. Movement of the workpiece carriage 34 along the axis of rotation of the workpiece 50 does not effect the distance from the Z-axis to the face surface 138 of the grinding wheel 62, Therefore, movement of the workpiece carriage 34 along the Z-axis does not effect any change in the data stored in the X-axis register 214.

Movement of the grinding wheel 62 toward and away from the workpiece 50 is effective to change the distance which the face surface 138 is spaced from the Z-axis 56. Therefore, the pulse input from the pulse generator 198 is also conducted over a lead 260 (FIG. 22) through multiplier 262 to an AND gate 264 which is enabled by the closing of a switch 268 by the computer when the grinding wheel 62 is moved toward and away from the workpiece. The multiplier 262 is effective to multiply the output from the pulse generator 198 by the sine of the angle which the path of movement of the grinding wheel 62 makes to the Z-axis 56. In the illustrated embodiment of the invention, the multiplier 262 is effective to multiply the pulses from the pulse generator 198 by the sine of 60 degrees. The output from the AND gate 264 is then transmitted to the X-axis register 214. When the grinding wheel 62 is being moved toward the workpiece 50, a count down switch 272 is closed to effect a reduction of the data stored in the register 214. Similarly, when the grinding wheel 62 is to be moved away from the workpiece 50, a count up switch 274 is closed so that the pulses transmitted from the AND gate 264 are effective to increase the data stored in the register 214.

Figure 22:
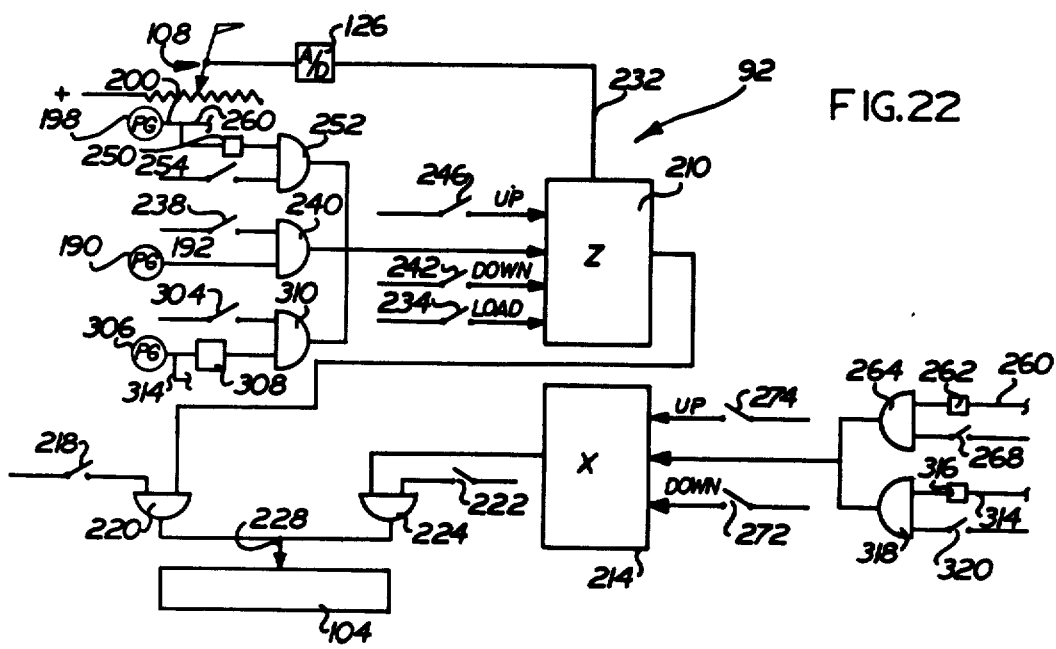
FIG. 22 is a schematic illustration of a pair of registers and illustrative control circuitry for varying the data stored in the registers.

It should be understood that the control circuitry of FIGS. 4 and 22 is set forth herein for purposes of clarity of understanding and that other and more complex circuitry could be utilized if desired.

Wheel Dressing

After the grinding wheel 62 has been utilized for a substantial period of time, it is contemplated that it will be necessary to dress the edge and side surfaces 130 and 138 of the grinding wheel to compensate for wear and dulling. This is accomplished by moving a dressing tool 280 (FIG. 23) into engagement with the grinding wheel 62. A suitable templet or forming bar (not shown) is provided to effect movement of the dressing tool 280 toward and away from the axis of rotation 66 of the grinding wheel 62 in a manner similar to that disclosed in U.S. Pat. No. 2,900,974. As the tool carriage 284 is moved along guide tracks 286 and 288 which extend parallel to the axis 66 about which the grinding wheel 62 rotates, the dressing tool 280 moves along the surface of the grinding wheel to generate or true the edge and face surfaces 130 and 138. The dressing tool carriage 284 is moved by a drive screw 292 which is rotated by an electric motor 294.

Figure 23:
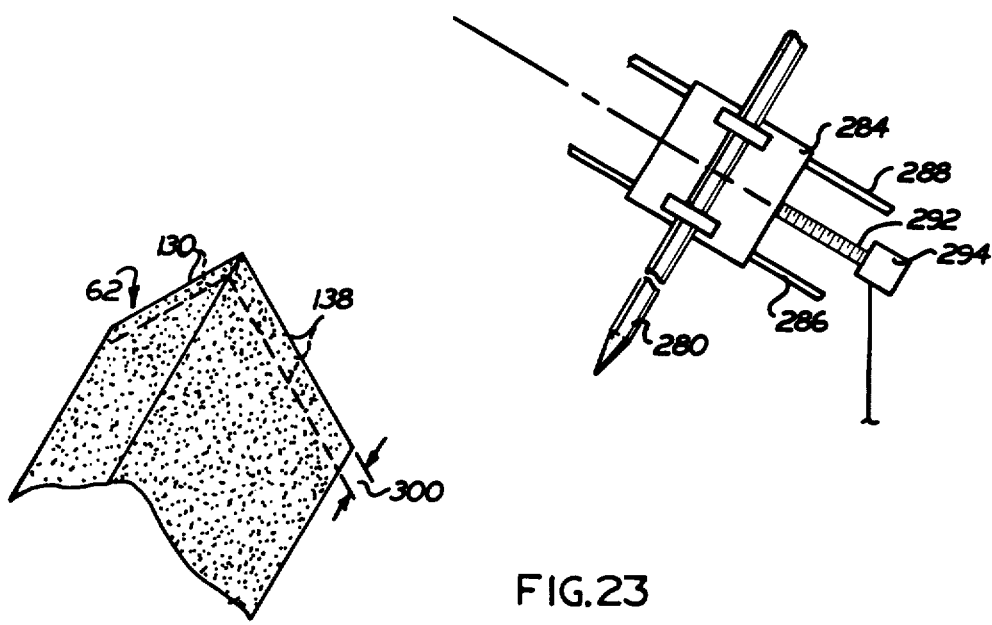
FIG. 23 is a schematic illustration of an apparatus utilized to dress the grinding wheel.

As the dressing tool 280 is moved across the face and side surfaces 138 and 130 of the rotating grinding wheel 62, the face and side surfaces are dressed inwardly from the location shown in solid lines in FIG. 23 to the location illustrated schematically in dashed lines in FIG. 23. Of course, once material has been removed from the grinding wheel 62, the edge end face surfaces of the grinding wheel are displaced radially inwardly toward the axis of rotation 66 of the grinding wheel by a distance which corresponds to the amount of material which has been removed during the dressing operation. Displacing the edge surface 130 and face surface 138 of the grinding wheel radially inwardly alters the position of these surfaces relative to the Z and X axes 56 and 100. Thus, the wheel dressing operation will cause the edge surface 130 to be displaced rightwardly (as viewed in FIG. 3) away from the X-axis 100 so that a reading of the location of the edge surface 130 taken on the Z-axis 56 would be increased. Similarly, dressing the grinding wheel causes the face surface 138 to be displaced upwardly (as viewed in FIG. 3) away from the Z-axis 56 so that a reading of the position of the face surface 138 taken on the X-axis 100 is also increased for a given position of the grinding wheel 62.

During a dressing operation the face and edge surfaces of the grinding wheel are offset radially inwardly through the same distance measured parallel to the path of movement of the grinding wheel toward and away from the workpiece 50. This distance has been indicated at 300 in FIG. 23. Since the face and edge surfaces 138 and 130 of the grinding wheel are both offset for the same known distance 300 by a wheel dressing operation, the data stored in the Z and X axis registers 210 and 214 can be varied to compensate for the offsetting of the face and edge surfaces 138 and 130 of the grinding wheel by a wheel dressing operation.

To vary the data stored in the Z-axis register 210 to compensate for a wheel dressing operation, a switch 304 (see FIG. 22) is closed and a predetermined number of pulses from a pulse generator 306 are transmitted through a multiplier 308 to an AND gate 310. The number of pulses from the pulse generator 306 corresponds to the distance 300 which the surface of the grinding wheel is offset along the path of movement of the grinding wheel toward and away from the workpiece 50. Therefore, the multiplier 308 multiplies the pulses from the pulse generator 306 by a factor corresponding to the cosine of the angle which the path of movement of the grinding wheel 62 makes with the Z-axis 56, that is by the cosine of 60 degrees in the illustrated embodiment of the invention. Since the edge surface 130 of the grinding wheel is displaced away from the X-axis 100 by a wheel dressing operation, the count up switch 246 is closed by the computer 92 and the pulses transmitted from the AND gate 310 to the Z-axis register 210 are effective to increase the count in the register.

In addition to changing the data stored in the Z-axis register 210 to compensate for movement of the edge surface 130 away from the X-axis 100, it is necessary to change the data stored in the X-axis register 214 to compensate from movement of the face surface 138 away from the Z-axis 56. To accomplish this, pulses from the pulse generator 306 are transmitted by a lead 314 (FIG. 22) to a multiplier 316 and connected with an AND gate 318. At this time a switch 320 is closed by the computer to enable the AND gate 318 to transmit the pulses to the X-axis register 214. The multiplier 316 multiplies the pulses transmitted to the lead 314 by a factor equal to the sine of the angle which the path of movement of the grinding wheel 62 makes with the Z-axis 56, that is the sine of 60 degrees in the illustrated embodiment of the invention. It should be noted that when the pulses are transmitted from the AND gate 318, the up count switch 274 is closed so that the X-axis register 214 is counted up to compensate for movement of the face surface away from the Z-axis 56.

Inches Per Revolution Wheel Feed

In known griding machines, the grinding wheel carriage drive motor is operated to move the grinding wheel toward the workpiece 50 at a feed rate which is calculated in terms of inches of movement per minute. In accordance with well known grinding practices, the rate of rotation of the workpiece is varied to obtain a desired relationship between the surface speed of the workpiece and the surface speed of the grinding wheel when grinding portions of the workpiece having different diameters. When these changes in rotational speed are effected, the feed rate of the grinding wheel carriage toward the workpiece is also varied. Although the variations in the feed rate of the grinding wheel carriage toward the workpiece may be varied so as to approximate operating conditions in which material is removed from the workpiece at the same rate during each revolution of the workpiece, this usually does not occur.

In accordance with a feature of the present invention, the grinding wheel feed rate is calculated in such a manner as to maintain the radial depth of material removed from the workpiece on each revolution of the workpiece constant during the grinding of portions of the workpiece having different diameters. The manually preset parameters of workpiece diameter, surface speed and feed rate are automatically manipulated by the computer 92 to effect operation of the motor 82 to move the grinding wheel 62 toward the workpiece 50 in such a manner as to effect the removal of the same radial depth of material on each revolution of the workpiece even though the rate of rotation of the workpiece may be varied for portions of the workpiece having different diameters.

When a portion of the workpiece 50 having a relatively small diameter is being ground, the workpiece 50 is rotated at a high speed about the Z-axis 56 to obtain the desired surface speed relationship between the cylindrical side surface of the workpiece and the grinding wheel. Since the workpiece has a small diameter, the grinding wheel 62 is moved forward at a fast rate to reduce the diameter of the workpiece a predetermined radial amount on each revolution of the workpiece. When a large diameter surface is being ground, the workpiece is rotated at a slower rate about the Z-axis to obtain the desired surface speed relationship with the grinding wheel 62. Assuming that it is desired to obtain the same type of finish as was previously obtained with a relatively small diameter portion of the workpiece, the same amount of metal should be removed on each revolution of the workpiece. Therefore, the grinding wheel 62 is advanced toward the workpiece at a slower rate to obtain the same rate of metal removal in terms of inches of radial depth per revolution of the workpiece.

Safety Features

The rotating grinding wheel 62 is normally maintained spaced apart from the rotating metal workpiece 50 during rapid movement of either the grinding wheel or the workpiece. If an operator of the grinding machine 30 is so extremely careless as to allow the grinding wheel 62 to engage the workpiece 50 during high speed movement of either the grinding wheel or the workpiece, the grinding wheel could be broken. Since the motor 88 is continuously rotating the grinding wheel 62 at a relatively high speed, the grinding machine 30 should be shut down or cause disengagment in the event of engagement of the grinding wheel 62 with the workpiece 50 during rapid movement of either the grinding wheel or the workpiece.

To provide the computer 92 with an indication that the grinding wheel 62 has engaged the workpiece 50 during rapid movement of either the grinding wheel or the workpiece, the current or voltage-current phase relationship transmitted to the motor 88 (FIG. 3) over the lead 206 is continuously monitored by a sensor 326. If the current required by the motor 88 to rotate the grinding wheel 62 exceeds a predetermined relatively low idle current during rapid movement of either the workpiece 50 or the grinding wheel, a signal is transmitted over a lead 328 to the computer 92 from the sensor 326. The computer 92 is programmed to immediately cause the grinding wheel 62 to be retracted away from the workpiece 50 and the grinding machine 30 to be shut down in the event that the current transmitted to the motor 88 increases over idle load current during rapid movement of either the grinding wheel 62 or the workpiece 50. It should be noted that the increase in the current required by the motor 88 to rotate the grinding wheel 62 would in all probability be the result of engagement of the grinding wheel 62 with an object, such as the workpiece 50. Therefore, an increase in the current required by the motor 88 to rotate the grinding wheel 62 provides an accurate indication that the grinding wheel 62 has engaged an object during rapid movement of either the grinding wheel or the workpiece.

It is contemplated that the load applied to the grinding wheel 62 during a grinding operation may become excessive. The application of excessive loads to the grinding wheel 62 during a grinding operation should be avoided to prevent breakage of the grinding wheel. In order to detect the application of excessive loads to the grinding wheel 62 during the grinding operation, the current transmitted to the grinding wheel drive motor 88 over the lead 206 is also monitored during the grinding operation. If the current required by the motor 88 to drive the grinding wheel 62 exceeds a predetermined rated load by a predetermined amount, a signal transmitted from the sensor 326 to the computer 92 causes the computer to effect operation of the grinding wheel carriage drive motor 82 to retract the grinding wheel and to shutdown the grinding machine 30.

During operation of the grinding machine 30 the careless application of excessive loads to the various parts of the grinding machine or extremely poor maintenance of the machine could cause the electrical controls to malfunction or a breakage of either the workpiece carriage drive screw 38 (see FIG. 3) or the grinding wheel carriage drive screw 84. In accordance with another feature of the present invention, the grinding machine 30 is automatically shutdown upon malfunctioning of the electrical controls or breakage of either the workpiece carriage drive shaft 38 or the wheel slide drive shaft 84.

Figure 24:
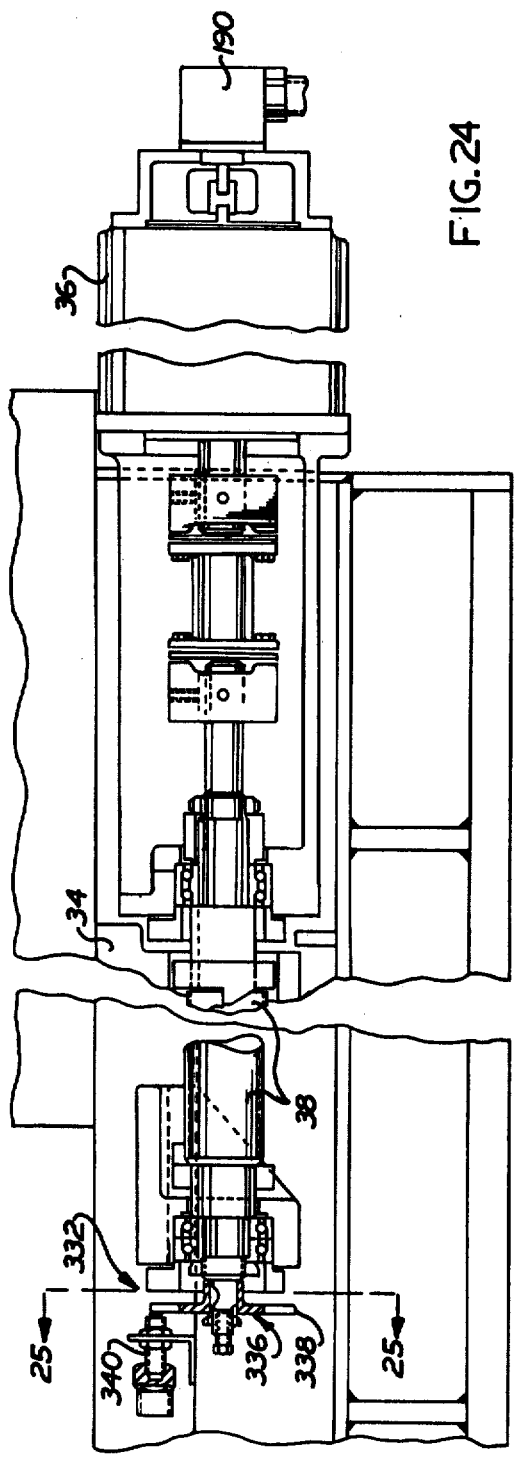
FIG. 24 is an enlarged view, depicting the relationship between a drive shaft utilized to effect axial movement of the workpiece, a motor for rotating the drive shaft, and a pair of pulse generators directly connected with the drive shaft.

To detect a malfunctioning of the electrical controls or breakage of the workpiece carriage drive shaft 38, the output from the pulse generator 190 (FIG. 24) at one end of the drive shaft 38 is compared with the output from second pulse generator 332 connected with the opposite end of the drive shaft. The pulse generator 190 is effective to provide a series of closely spaced pulses which accurately indicate the extent to which the drive screw 38 has been rotated and the extent to which the carriage 34 has been moved along the drive screw. Since the pulse generator 332 (FIG. 24) is utilized to detect only a major malfunction of the machine, such as breakage of the shaft 38, the pulse generator 332 does not have to be as fine as the pulse generator 190.

Figure 25:
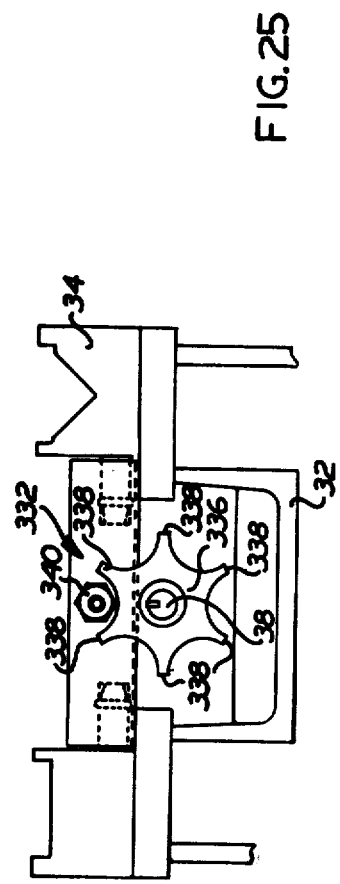
FIG. 25 is a view taken along the line 25—25 of FIG. 24 and further illustrating the construction of one of the pulse generators.

The relatively coarse pulse generator 332 includes a magnetizable metal wheel 336 (see FIG. 25) having a plurality of projections 338 which are moved past a proximity switch 340 as the drive shaft 38 is rotated. Moving the projections 338 (FIG. 25) past the proximity switch 340 results in the generation of a pulse each time a projection moves past the proximity switch. Since the projections 338 are spaced a substantial distance apart, the proximity switch provides a series of widely spaced pulses. The series of pulses from the coarse pulse generator 332 is compared with the series of pulses from the fine pulse generator 190. If the distance corresponding to the series of coarse pulses from the pulse generator 332 is different from the distance corresponding to the series of pulses of the fine pulse generator 190 by a predetermined amount, the motor 36 is driving one end of the carriage drive shaft 38 at a speed which is different than the speed at which the other end of the carriage drive shaft is being driven. Of course, this indicates a breakage of the shaft 38 or other malfunction of the machine. Therefore, when this occurs the grinding machine 30 is immediately shutdown by the computer 92.

A coarse pulse generator 334 (FIG. 26) is associated with the drive shaft 84 for the grinding wheel carriage 70. The coarse pulse generator 334 includes a wheel 348 (FIG. 27) having a plurality of gaps or notches 350. Each time a notch 350 is moved past a proximity switch 352, the proximity switch provides an output pulse. The series of widely spaced pulses from the coarse pulse generator 334 are compared with a series of closely spaced pulses from the fine control pulse generator 198 (FIG. 26). When the distance corresponding to the series of pulses from the fine pulse generator 198 varies from the distance corresponding to the series of pulses from the coarse pulse generator 334 by a predetermined amount, the grinding meachine 30 is shutdown.

Figure 28:
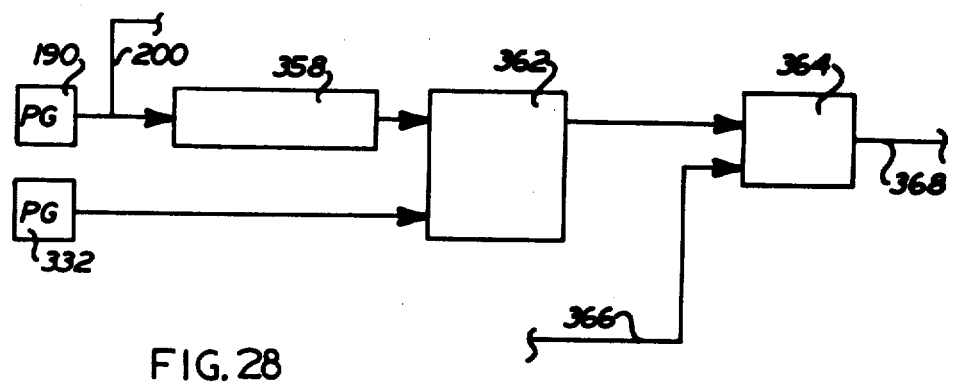
FIG. 28 is a schematic illustration of illustrative control circuitry utilized in association with the pulse generators of FIGS. 24 and 25.

Control circuitry for comparing the pulses from the fine pulse generator 190 connected with the workpiece carriage drive shaft 38 with the coarse pulse generator 332 connected with the opposite end of the workpiece drive shaft is illustrated in FIG. 28. This control circuitry includes a rate multiplier 358 which receives the series of closely spaced pulses from the fine pulse generator 190. The output from the multiplier 358 is a series of widely spaced pulses each of which corresponds to an amount of rotation of the drive shaft 38 represented by a pulse from the pulse generator 332 and the series of similarly spaced pulses fom the rate multiplier 358 are transmitted to a subtractor 362.

The subtractor 362 substrates the pulses received from the rate multiplier 358 from the pulses received from the pulse generator 332. The output from the subtractor 362 is transmitted to a comparator 364. The comparator 364 compares the output from the subtractor 362 with a predetermined allowed error signal transmitted over a lead 366. In the event that the output from the subtractor 362 exceeds the predetermined error signal, the comparator 364 provides an output signal over a lead 368. During normal operation of the grinding machine 30, the number of pulses transmitted to the subtractor 362 from the pulse generator 190 and rate multiplier 358 will be equal to the number of pulses transmitted to the subtractor from the coarse pulse generator 332. Therefore, the output from the subtractor 362 will not exceed the predetermined error signal transmitted to the comparator 364. However, in the event of a malfunction of the grinding machine 30 due to breakage of the drive shaft 38 or other causes, the number of pulses transmitted to the subtractor 362 from the pulse generator 190 and rate multiplier 358 will differ from the number of pulses transmitted to the subtractor from the coarse pulse generator 332. This difference will quickly exceed the relatively small allowed error signal transmitted to the comparator 364 so that an emergency signal will be transmitted over the lead 368 to cause the computer 92 to effect a shutdown of the grinding machine 30.

Although only the control circuitry associated with the coarse pulse generator 332 and fine pulse generator 190 connected to the workpiece carriage drive shaft 38 are illustrated in FIG. 28, it should be understood that similar control circuitry is provided in association with the fine pulse generator 198 and coarse pulse generator 344 associated with the grinding wheel slide drive shaft 84 and carriage 70.

SUMMARY

In view of the foregoing it is apparent the present invention provides a grinding machine which is operated in such a manner as to grind a radially extending shoulder 158 and an axially extending side 154 of a metal workpiece 50 with an angled wheel 62 during repeated traverse grind work strokes (FIGS. 10–15). At one end of each of the traverse grind work strokes (FIG. 12), an edge surface 130 of the grinding wheel 62 engages the radial shoulder 158 of the workpiece while a face surface 138 of the grinding wheel engages the side 154 of the workpiece. To compensate for movement of the grinding wheel 62 toward the workpiece 50 along the angled path, upon completion of a traverse grinding work stroke, the workpiece 50 is moved to shift the shoulder away from the edge surface 130 of the grinding wheel 62 before the grinding wheel is moved inwardly toward the axis of rotation of the workpiece.

Upon grinding a portion of the workpiece 50 having a first diameter (FIG. 6) and prior to grinding a portion of the workpiece having a second larger diameter, the grinding wheel 62 is retracted to a predetermined clear point (FIG. 7). When the grinding wheel 62 has been retracted to the clear point, the face surface of the grinding wheel is disposed a predetermined distance outwardly of the next portion of the workpiece. By selecting a clearpoint which is disposed only a small distance outwardly of the surface of the portion of the workiece to be ground next, the grinding wheel is only retracted to the extent necessary.

Although the grinding wheel 62 moves along a path extending at an acute angle to the axis of rotation of the workpiece, the face surface 138 of the grinding wheel 62 extends parallel to the axis of rotation of the workpiece and the edge surface 130 of the grinding wheel extends perpendicular to the axis of rotation of the workpiece. Due to this relationship between the surfaces of the grinding wheel and the workpiece, it is desirable to know the position of the surfaces of the grinding wheel relative to the workpiece in terms of orthogonal axes rather than nonorthogonal axes. This is true even though the grinding wheel 62 moves along a path extending at an acute angle to the axis of rotation of the workpiece.

Accordingly, a Z-axis register 210 is provided to store data corresponding to the position of the edge surface 130 of the grinding wheel along the axis of rotation of the workpiece. An X-axis register 214 is provided to store data corresponding to the position of the face surface 138 of the grinding wheel along an axis extending perpendicular to the axis of workpiece rotation. Since the positions of both the edge and face surfaces 130, 138 of the grinding wheel 62 relative to the two perpendicular axes vary as the grinding wheel 62 is moved along a path extending in an acute angle to one of the axes, the data stored in both of the registers 210 and 214 is varied as the grinding wheel 62 is moved along the path extending at an acute angle to the axis of rotation of the workpiece. In order to compensate for the angled orientation of the path of movement of the grinding wheel, the data stored in the registers 210 and 214 is varied as a function of the cosine and sine of the acute angle between the path of movement of the grinding wheel and the axis of rotation of the workpiece. Since the position of the face surface 138 does not vary relative to the axis of rotation of the workpiece 50 upon movement of the workpiece along its axis of rotation, only the data stored in the Z-axis register 210 is varied when the workpiece is moved along its axis of rotation.

During initial locating of a workpiece 50 in association with a grinding machine 30 constructed in accordance with the present invention, a reference surface 110 (FIG. 4) on the workpiece does not have to be exactly positioned in a predetermined location relative to a reference plane 112. The workpiece is merely located with the reference surface 110 closely adjacent to the reference plane. The data stored in the Z-axis register 210 is adjusted to compensate for the distance which the reference surface 110 is offset from the radially extending reference plane 112. It should be noted that having the reference surface 110 on the workpiece offset from the reference plane effects the location of the edge surface 130 of the grinding wheel relative to an axially extending side of the workpiece. Therefore, it is necessary to adjust the data stored in only the Z-axis register 210 for the distance which the reference surface 110 is offset from the radially extending reference plane 112.

A grinding machine operated in accordance with the present invention can effect movement of the grinding wheel 62 through extremely small increments toward the axis of rotation of a workpiece. This is done by moving the grinding wheel 62 away from the workpiece 50 through a relatively large distance and then moving the grinding wheel back toward the workpiece through a distance equal to the sum of the large distance which it was moved away from the workpiece and the small distance which it is desired to move the grinding wheel toward the workpiece. The net result of this movement of the grinding wheel away from and then toward the workpiece is to move the grinding wheel through a small distance toward the workpiece.

A radially extending shoulder on a workpiece 50, such as the shoulder 134, can be shifted through a relatively small distance along the axis of rotation of the workpiece in a similar manner. Thus, when the shoulder 134 is to be moved a small distance in a direction away from the grinding wheel 62, the workpiece 50 is first moved through a relatively large axial distance in a direction away from the grinding wheel. The workpiece is then moved axially back toward the grinding wheel 62 through a distance equal to the relatively large distance minus the relatively small distance.

The grinding machine can be operated in accordance with the present invention to remove the same radial depth of material from a workpiece during each revolution of relatively large and small diameter portions of the workpiece. This is accomplished by adjusting the grinding wheel feed rate to move the grinding wheel 62 inwardly through the same distance toward the workpiece on each revolution of the workpiece even though the rate of rotation of the workpiece is adjusted to provide a constant surface speed. The manually preset parameters of workpiece diameter and surface speed are automatically manipulated by the control system to calculate and set the correct wheel slide feed rate in inches per minute to correspond to the desired rate of removal of material from the workpiece in inches per revolution of the workpiece.

During rapid movement of the grinding wheel 62 relative to the workpiece 50 and during rapid movement of the workpiece relative to the grinding wheel, there is a relatively small or idle load on the motor 88 which rotates the grinding wheel. Accordingly, a relatively small current is normally required during high speed wheel or workpiece movement to effect operation of the motor 88 which rotates the grinding wheel 62. If this current increases due to engagement of the grinding wheel 62 with the workpiece or other object, the rapid movement between the grinding wheel 62 and the workpiece 50 is terminated and the grinding wheel is moved to a retracted position. Similarly, if during a grinding operation the current required to operate the motor which effects rotation of the grinding wheel 62 increases to an amount which is greater than a predetermined maximum amount, the grinding operation is interrupted to prevent the application of excessive forces to the grinding wheel.

Although it is contemplated that the electrical circuitry will not malfunction and that the drive shafts 38 and 84 for moving the workpiece 50 and the grinding wheel 62 will not be broken during normal operation of the grinding machine, it is possible that they could be broken due to maltreatment of the machine or other unforeseen circumstances. To provide for an immediate indication of this occurrence, a fine pulse generator 190 or 198 utilized in association with machine control circuitry is connected to one end of a drive shaft while a relatively coarse pulse generator 332 or 344 is connected with the opposite end of the drive shaft. If the drive shaft should break between the two pulse generators or other malfunction occur, the outputs from the pulse generators would be different. Therefore, the malfunction can be detected by comparing the output of the two pulse generators. When the outputs of the generators differ by a predetermined amount thereby indicating a malfunction, operation of the grinding machine is shut down.

Although many of the features of the grinding machine 30 have been described herein in association with a grinding wheel 62 which moves along a path extending at an acute angle to the axis of rotation of the workpiece 50, it is contemplated that some of the features of the grinding wheel 30 could be utilized in association with a grinding machine having a grinding wheel which is moved toward and away from the workpiece along a path extending perpendicular to the axis of rotation of the workpiece. For example, it is contemplated that the workpiece locating apparatus of FIG. 4 could be advantageously utilized to enable a workpiece to be located relative to a grinding wheel which moves along a path extending perpendicular to the axis of rotation of the workpiece. Similarly, many of the safety features described in connection with FIGS. 24 through 28 could be utilized in association with different types of grinding machines. It should also be understood that although the computer 92 has been disclosed herein as having a particular construction, computers of different constructions could be utilized in association with the grinding machine 30. Furthermore, it is contemplated that the grinding machine 30 may be constructed with a swivel table for use in taper grinding. Although dimensions and feed rates have been referred to herein in terms of the English system, the metric system could be used if desired.

Having described specific preferred embodiments of the invention, the following is claimed:

1. A method of grinding a workpiece having a plurality of radially projecting shoulders and a plurality of cylindrical sides, said method comprising the steps of rotating the workpiece about a first axis, rotating the grinding wheel about a second axis extending at an acute angle to the first axis, grinding a shaft cylindrical side of the workpiece, moving the rotating grinding wheel away from the first side of the rotating workpiece along a path extending at an acute angle to the first axis, interrupting movement of the grinding wheel along the path when the grinding wheel has moved to a first clear point position in which a surface of the grinding wheel is spaced apart from the first axis by a first distance, moving the rotating workpiece in a first direction along the first axis, grinding a second cylindrical workpiece side having a radius which is different than the first distance between the surface of the grinding wheel and the first axis, moving the rotating grinding wheel away from the second side of the rotating workpiece along the path which extends at an acute angle to the first axis, interrupting movement of the grinding wheel along the path when the grinding wheel has moved to a second clear point position in which the surface of the grinding wheel is spaced apart from the first axis by a second distance which is different than said first distance, moving the rotating workpiece along the first axis, and grinding a third cylindrical workpiece side having a radius which is less than the second distance between the surface of the grinding wheel and the first axis and which is different than the radius of the second cylindrical workpiece side to thereby use different clear point positions in association with cylindrical workpiece sides of different sizes.

2. A method as set forth in claim 1 wherein said steps of grinding the first, second and third sides of the workpiece include the step of feeding the grinding wheel toward the workpiece through the same radial distance on each of a plurality of revolutions of the workpiece to decrease the diameter of each of the sides in turn by the same amount during each of the plurality of revolutions of the workpiece.

3. A method as set forth in claim 1 further including the step of reciprocating the workpiece back and forth along the first axis during the step of grinding at least one of the cylindrical sides of the workpiece.

4. A method as set forth in claim 1 further including the steps of providing first and second register means, storing in the first register means data corresponding to the position of the first surface of a grinding wheel relative to a plane extending perpendicular to the first axis and located in a predetermined position relative to a shoulder of the workpiece, storing in the second register means data corresponding to the position of a second surface on the grinding wheel relative to the first axis, changing the data stored in both the first and second register means contemporaneoulsy with performing of said step of moving the grinding wheel along a path extending at an acute angle to the first axis.

5. A method as set forth in claim 4 further including the step of changing the data stored in only the first register means contemporaneously with performing of said steps of moving the workpiece along the first axis.

6. A method as set forth in claim 4 further including the step of providing a single readout means and sequentially displaying data corresponding to the data stored in the first and second register means with the single readout means.

7. A method as set forth in claim 1 further including the steps of providing first and second signal generators, and during the performance of said step of moving the grinding wheel along a path extending at an acute angle to the first axis performing the steps of operating the first signal generator to provide a first series of signals each of which corresponds to a relatively small increment of movement of the grinding wheel along the path, operating the second signal generator to provide a second series of signals each of which corresponds to a relatively large increment of movement of the grinding wheel, comparing the first and second series of signals, and interrupting movement of the grinding wheel when the distance corresponding to one of the series of signals differs from the distance corresponding to the other series of signals by a predetermined amount.

8. A method as set forth in claim 1 further including the steps of providing a register, storing in the register data corresponding to the position of a surface on the grinding wheel relative to a reference plane disposed in a predetermined position relative to the workpiece and extending transversely to the first axis, locating a reference surface on the workpiece relative to the reference plane by moving the workpiece along the first axis to a position in which the reference surface is adjacent to and spaced apart from a predetermined locating position, determining the difference between the locating position and the actual position of the reference surface, and changing the data stored in the register by an amount corresponding to the difference between the locating position and the actual position of the reference surface to compensate for positioning the reference surface on the workpiece at a position other than the locating position.

9. A method as set forth in claim 8 wherein said step of determining the difference between the locating position and the actual position of the reference surface relative to the reference plane includes the step of engaging the reference surface with a probe member.

10. A method as set forth in claim 8 further including the steps of initiating a grinding operation with the reference surface spaced apart from the predetermined locating position.

11. A method of grinding a workpiece comprising the steps of rotating the workpiece about a first axis, rotating the grinding wheel about a second axis, moving the rotating grinding wheel toward the first axis, moving the rotating workpiece along the first axis, providing first and second signal generators, during the performance of said step of moving the grinding wheel toward the first axis performing the steps of operating the first signal generator to provide a first series of signals each of which corresponds to a relatively small increment of movement of the grinding wheel, operating the second signal generator to provide a second series of signals each of which corresponds to a relatively large increment of movement of the grinding wheel, comparing the first and second series of signals, and interrupting movement of the grinding wheel toward the first axis when the distance corresponding to one of the series of signals differs from the distance corresponding to the other series of signals by a predetermined 12. A method as set forth in claim 11 further including the step of providing third and fourth signal generators, during the performance of said step of moving the workpiece along the first axis performing the steps of operating the third signal generator to provide a third series of signals each of which corresponds to a relatively small increment of movement of the workpiece, operating the fourth signal generator to provide a fourth series of signals each of which corresponds to a relatively large increment of movement of the workpiece, comparing the third and fourth series of signals, and interrupting movement of the workpiece when the distance corresponding to one of the third and fourth series of signals differs from the distance corresponding to the other of the third and fourth series of signals by a predetermined amount.

13. A method as set forth in claim 11 further including the steps of rapidly moving the grinding wheel toward the workpiece from a retracted position to an intermediate position, the grinding wheel normally being spaced apart from the workpiece during the rapid movement between the retracted and intermediate positions, operating an electric motor to rotate the grinding wheel during the rapid movement of the grinding wheel between the retracted and intermediate positions, detecting when the electrical current required to operate the motor exceeds a predetermined amount due to engagement of the rotating grinding wheel with an object during the rapid movement of the grinding wheel, and interrupting the rapid movement of the grinding wheel toward the workpiece in response to an increase in the motor current required to rotate the grinding wheel to an amount which is in excess of a predetermined amount.

14. An apparatus for use in grinding a workpiece, said apparatus comprising means for supporting the workpiece for rotation about and movement along a first axis, first motor means for rotating the workpiece about the first axis, a grinding wheel having first and second surfaces for engaging a workpiece during a grinding operation, means for supporting said grinding wheel for rotation about a second axis which extends at an acute angle to the first axis and for supporting said grinding wheel for movement toward and away from the first axis along a path extending at an acute angle to the first axis, second motor means for rotating the grinding wheel about the second axis, third motor means for effecting movement of the grinding wheel toward and away from the first axis along the path extending at an acute angle to the first axis, first register means for storing data corresponding to the position of the first surface on the grinding wheel relative to a reference plane disposed in a predetermined position relative to the workpiece and extending transversely to the first axis, second register means for storing data corresponding to the position of the second surface on the grinding wheel relative to the first axis, means for changing the data stored in said first and second register means contemporaneously with movement of the grinding wheel toward the first axis along the path extending at an acute angle to the first axis, and means for changing the data stored in said first register means contemporaneously with movement of the workpiece along the first axis while maintaining the data stored in said second register means constant.

15. An apparatus as set forth in claim 14 wherein said means for changing the data stored in said first and second register means includes means for varying the data stored in said first register means as a function of the distance which the grinding wheel moves along the path extending at an acute angle to the first axis and as a function of the cosine of the acute angle between the path and the first axis and means for varying the data stored in said second register means as a function of the distance which the grinding wheel moves along the path and as a function of the sine of the acute angle between the path and the first axis.

16. An apparatus as set forth in claim 15 further including wheel dressing means for removing material from the grinding wheel at the first and second surfaces, and means for varying the data stored in said first and second register means as a function of the amount of material which is removed from the grinding wheel by said wheel dressing means.

17. A method of grinding a workpiece, said method comprising the steps of rotating the workpiece about a first axis, rotating the grinding wheel about a second axis, providing a register, storing in the register data corresponding to the position of a surface on the grinding wheel relative to a reference plane disposed in a predetermined position relative to the workpiece and extending transversely to the first axis, locating a reference surface on the workpiece relative to the reference plane by moving the workpiece along the first axis to a position in which the reference surface is adjacent to and spaced apart from a predetermined locating position, determining the difference between the locating position and the actual position of the reference surface, and changing the data stored in the register by an amount corresponding to the difference between the locating position and the actual position of the reference surface to compensate for positioning of the reference surface on the workpiece at a position other than the locating position.

18. A method as set forth in claim 17 wherein said step of determining the difference between the locating position and the actual position of the reference surface relative to the reference plane includes the steps of engaging the reference surface with a probe member and actuating a transducer to provide an output signal which varies as a function of the position of the probe member.

19. A method as set forth in claim 17 further including the steps of initiating a grinding operation with the reference surface spaced apart from the predetermined locating position and maintaining the difference between the locating position and actual position of the reference surface constant during the grinding operation.

20. An apparatus for use in grinding a workpiece, said apparatus comprising means for rotating the workpiece about a first axis, a grinding wheel having surface means for engaging the workpiece during a grinding operation, register means for storing data correspondingly to the position of said grinding wheel surface means relative to a reference surface on the workpiece, means for adjusting the position of the workpiece along the first axis to move the workpiece to an initial position in which the reference surface on the workpiece is adjacent to and spaced apart from a predetermined reference plane, detector means for determining the distance between the reference surface on the workpiece and the predetermined reference plane when the workpiece is in the initial position, and means for varying the data stored in said register means by an amount corresponding to the distance between the reference surface on the workpiece and the predetermined reference plane when the workpiece is in the initial position to compensate for initially positioning the reference surface on the workpiece at a position in which the reference surface is spaced apart from the reference plane.

21. An apparatus as set forth in claim 20 further including drive means for effecting relative movement between said grinding wheel and workpiece to effect a change in the position of said grinding wheel surface means relative to the reference surface on the workpiece, and means for changing the data stored in said register means by an amount corresponding to the change in the position of said grinding wheel surface means relative to the reference surface on the workpiece during relative movement between the grinding wheel and workpiece.

22. An apparatus as set forth in claim 20 wherein said detector means includes a probe member which is movable relative to the workpiece between a retracted position spaced apart from the reference surface on the workpiece and a locating position engaging the reference surface on the workpiece and means for providing an output signal which varies as a function of the displacement of said probe from a predetermined reference position when said probe is in the locating position.

23. An apparatus for use in grinding a workpiece, said apparatus comprising means for rotating the workpiece about a first axis, a rotatable grinding wheel having surface means for engaging the rotating workpiece during a grinding operation, means for rotating the grinding wheel about a second axis, drive means for effecting relative movement between said grinding wheel and workpiece, first signal generator means for providing a first series of signals during relative movement between said grinding wheel and workpiece, each signal of said first series of signals corresponding to a relatively small increment of relative movement between said grinding wheel and workpiece, second signal generator means for providing a second series of signals during relative movement between said grinding wheel and workpiece, each signal of said second series of signals corresponding to a relatively lare increment of relative movement between said grinding wheel and workpiece, means for detecting when the distance represented by the first series of signals differs from the distance represented by the second series of signals by more than a predetermined amount during relative movement between said grinding wheel and workpiece, and means for interrupting relative movement between said grinding wheel and workpiece when the distance represented by the first series of signals differs from the distance represented by the second series of signals by more than the predetermined amount.

24. An apparatus as set forth in claim 23 wherein said drive means includes motor means for effecting movement of the workpiece along the first axis and for effecting operation of said first and second signal generators at rates which vary as a function of variations in the rate of movement of the workpiece along the first axis.

25. An apparatus as set forth in claim 23 wherein said drive means includes motor means for effecting movement of said grinding wheel toward and away from the first axis and for effecting operation of said first and second signal generators at rates which vary as a function of variations in the rate of movement of the grinding wheel toward and away from the first axis.

26. A method of grinding a workpiece having a plurality of radially projecting shoulders and a plurality of different diameter cylindrical sides comprising the steps of:
(a) rotating the workpiece about a first axis;
(b) rotating the grinding wheel about a second axis extending at an acute angle to the first axis;
(c) moving the rotating grinding wheel away from the first cylindrical side of the rotating workpiece, along a path extending at an angle to the first axis;
(d) interrupting movement of the grinding wheel along the path when the grinding wheel has moved to a first clear point position wherein a surface of the grinding wheel is spaced from the first axis a distance slightly greater than the radius of the second cylindrical side;
(e) shifting the workpiece along the first axis a distance, which is a function of the distance the grinding wheel is moved along its path of movement and the angle the path makes with the first axis, to a position in close proximity to the surface of the grinding wheel;
(f) moving the grinding wheel toward the first axis to engage the second cylindrical side of the rotating workpiece; and
(g) moving the rotating workpiece along the first axis to grind the second cylindrical side of the rotating workpiece.

27. A method as claimed in claim 26 wherein:
the workpiece is shifted along the first axis a distance which is a function of the longitudinal separation of the first and second cylindrical sides, the distance the grinding wheel is moved along its path, and the cosine of the acute angle between the path and the first axis.

28. A method as claimed in claim 26 wherein steps (c) and (e) occur in overlapping time periods.

29. Apparatus for grinding a plurality of different diameter cylindrical portions on a workpiece comprising:
workpiece rotating means for rotating the workpiece about its longitudinal axis;
a grinding wheel having a first grinding surface for grinding longitudinally extending portions of the workpiece and a second grinding surface for grinding radially extending portions of the workpiece;
grinding wheel rotating means for rotating said grinding wheel about an axis extending at an angle to the longitudinal axis of the workpiece;
grinding wheel positioning means for moving said grinding wheel along a path which extends at less than a 90° angle with respect to the longitudinal axis of the workpiece;
compensating means for shifting the workpiece along its longitudinal axis in response to movement of the grinding wheel along its path as a function of distance moved along the path and the angle of the path with respect to the longitudinal axis of said workpiece.

30. Apparatus for grinding as claimed in claim 29 comprising:
clear point stop means operable when changing from grinding a cylindrical portion having a first radius to start grinding a cylindrical portion having a second radius for controlling said grinding wheel positioning means to position said grinding wheel so the first grinding surface is separated by a distance slightly greater than the second radius from the longitudinal axis of the workpiece.

31. Apparatus as claimed in claim 29 comprising:

clear point stop means operable when changing from grinding a portion having one radius to a portion having another radius for positioning said grinding wheel slightly further from the workpiece longitudinal axis than the radius of the next cylindrical portion to be ground.

32. Apparatus as claimed in claim 31 wherein:

said compensating means shifts the workpiece along its longitudinal axis in response to movement of the grinding wheel along its path as a function of the cosine of the angle between the path and the workpiece longitudinal axis, the distance the grinding wheel is moved along its path, and the separation between the cylindrical portion which was just ground and the next cylindrical portion to be ground.

33. An apparatus for use in grinding a workpiece having a plurality of radially projecting shoulders and a plurality of cylindrical sides with different diameters, said apparatus comprising a base, a workpiece carriage movably mounted on said base, means for rotatably supporting the workpiece on said carriage, first motor means for rotating the workpiece relative to said carriage about a first axis, second motor means for moving said carriage along a first path extending parallel to said first axis, a wheel slide movably mounted on said grinding wheel rotatably supported on said wheel slide and rotatable about a second axis which extends at an acute angle to the first axis, third motor means for rotating said grinding wheel about the second axis, fourth motor means for moving said wheel slide along a second path extending at an acute angle to the first axis and transversely to the second axis, and control means for controlling operation of said second and fourth motor means to effect sequential grinding of cylindrical sides of the workpiece, said control means including first means for effecting operation of said fourth motor means to move said wheel slide relative to said base along the second path in a direction toward the first axis to move said grinding wheel into engagement with a first cylindrical side of the workpiece while the workpiece is in a first position along said first axis and while said first motor means is rotating the workpiece about the first axis and while said third motor means is rotating the grinding wheel about the second axis, said first means including means for effecting operation of said fourth motor means to move said wheel slide relative to said base along the second path in a direction away from the first axis to move said grinding wheel to a first clear point position in which a peripheral surface of said grinding wheel is spaced apart from the first axis by a first distance, and second means for effecting operation of said second motor means to move said carriage in a first direction relative to said base to move the workpiece to a second position in which a second cylindrical side of the workpiece having a radius which is slightly less than the first distance is adjacent to the peripheral surface of said grinding wheel while said grinding wheel is at the first clear point position, said first means including means for effecting operation of said fourth motor means to move said wheel slide along the second path to move said rotating grinding wheel from the first clear point position into engagement with the second cylindrical side of the rotating workpiece, said first means including means for effecting operation of said fourth motor means to move said wheel slide relative to said base along the second path in a direction away from the first axis to move said grinding wheel to a second clear point position in which the peripheral surface of said grinding wheel is spaced apart from the first axis by a second distance which is different from the first distance, said second means including means for effecting operation of said second motor means to move said carriage in the first direction relative to said base to move the workpiece to a third position in which a third cylindrical side of the workpiece having a radius which is slightly less than the second distance is adjacent to the peripheral surface of said grinding wheel while said grinding wheel is at the second clear point position, said first means including means for effecting operation of said fourth motor means to move said wheel slide along the second path to move said rotating grinding wheel from the second clear point position into engagement with the third cylindrical side of the rotating workpiece.

34. An apparatus as set forth in claim 33 wherein said control means further includes means for effecting operation of said fourth motor means to move said wheel slide toward the first axis through a third distance on each of a plurality of revolutions of the workpiece during the grinding of the first cylindrical side, for effecting operation of said fourth motor means to move said wheel slide toward the first axis through the third distance on each of a plurality of revolutions of the workpiece during grinding of the second cylindrical side, and for effecting operation of said fourth motor means to move said wheel slide toward the first axis through the third distance on each of a plurality of revolutions of the workpiece during grinding of the third cylindrical side.

35. An apparatus as set forth in claim 33 whrein said grinding wheel has first surface means for grinding a cylindrical side of the workpiece and second surface means for grinding a radially projecting shoulder of the workpiece, said control means including first register means for storing data corresponding to the position of said first surface means relative to a third axis extending perpendicular to and intersecting the first axis, second register means for storing data corresponding to the position of said second surface means relative to said first axis, and means for changing the data stored in said first and second register means upon movement of said wheel slide along the second path.

36. An apparatus as set forth in claim 35 wherein said control means includes means for changing the data stored in said second register means while maintaining the data stored in said first register means constant during movement of said carriage along the first path.

37. An apparatus as set forth in claim 36 further including display means for sequentially displaying data corresponding to the data stored in said first and second register means.

38. An apparatus as set forth in claim 33 wherein said fourth motor means includes an electric motor, said control means including means for detecting when the electrical current required to operate said electrical motor exceeds a predetermined amount and for interrupting operation of said electric motor in response to an increase in the current required to operate said electric motor to a current which is in excess of the predetermined amount.

39. An apparatus as set forth in claim 33 further including register means for storing data corresponding to the position of a surface on said grinding wheel relative to a reference surface on the workpiece, detector means for determining the distance between a reference surface on the workpiece and a predetermined reference plane when the workpiece is in an initial position, and means for varying the data stored in said register means by an amount corresponding to the distance between the reference surface on the workpiece and the predetermined reference plane when the workpiece is in the initial position to compensate for initially positioning the reference surface on the workpiece at a position in which the reference surface is spaced apart from the reference plane.

40. An apparatus as set forth in claim 39 further including means for changing the data stored in said register means by an amount corresponding to a change in the position of the surface on said grinding wheel relative to the reference surface on the workpiece during relative movement between the grinding wheel and workpiece.

41. An apparatus as set forth in claim 39 wherein said detector means includes a probe member which is movable relative to the workpiece between a retracted position spaced apart from the reference surface on the workpiece and a locating position engaging the reference surface on the workpiece and means for providing an output signal which varies as a function of the displacement of said probe member from a predetermined reference position when said probe member is in the locating position.

42. An apparatus for use in grinding a workpiece having a cylindrical side and a radially projecting shoulder which extends perpendicular to the cylindrical side, said apparatus comprising a base, a workpiece carriage movably mounted on said base, means for rotatably supporting the workpiece on said carriage, first motor means disposed on said carriage for rotating the workpiece relative to said carriage about a first axis, second motor means disposed on said base for moving said carriage along a first path extending parallel to said first axis, a wheel slide movably mounted on said base, a grinding wheel rotatably supported on said wheel slide and rotatable about a second axis which extends at an acute angle to the first axis, said grinding wheel having first surface means for grinding the shoulder of the workpiece and second surface means for grinding the cylindrical side of the workpiece, third motor means disposed on said wheel slide for rotating said grinding wheel about the second axis, fourth motor means disposed on said base for moving said wheel slide along a second path extending at an acute angle to the first axis and perpendicular to the second axis whereby upon movement of said wheel slide along the second path said grinding wheel has a component of movement extending parallel to the first axis and a component of movement extending perpendicular to the first axis, and control means for controlling operation of said second and fourth motor means to move said wheel slide relative to said base along the second path and to move said carriage along the first path to effect engagement of said first surface means on said rotating grinding wheel with the shoulder of the rotating workpiece and to effect engagement of said second surface means on said rotating grinding wheel with the side of the rotating workpiece to grind the side and shoulder of the workpiece and to thereafter move said wheel slide relative to said base in a direction away from said first axis to retract said grinding wheel from the workpiece, said control means including compensation means for compensating for the component of movement of said grinding wheel in a direction parallel to said first axis during movement of said wheel slide along the second path, said compensation means including means for initiating movement of said wheel slide along the second path from a position in which said first surface means on said grinding wheel is offset from the radially projecting shoulder of the workpiece along the first axis by a distance which is at least substantially equal to the component of movement of said grinding wheel in a direction parallel to the first axis during movement of said wheel slide along the second path.

43. An apparatus as set forth in claim 42 wherein said control means includes means for repetitively reversing the direction of operation of said second motor means to reciprocate the workpiece along the first axis while said second surface means on said grinding wheel is disposed in engagement with the cylindrical side of the workpiece.

44. An apparatus as set forth in claim 43 wherein said means for repetitively reversing the direction of operation of said second motor means includes means for repetitively reversing the direction of operation of said second motor means when said first surface means on said grinding wheel engages the shoulder of the workpiece.

45. An apparatus for use in grinding a workpiece having a radially projecting shoulder and a cylindrical side, said apparatus comprising a base, means for rotatably supporting the workpiece for rotation relative to said base about a first axis, a wheel slide movably mounted on said base, a grinding wheel rotatably supported on said wheel slide and rotatable about a second axis which extends at an acute angle to the first axis, said grinding wheel having first surface means for grinding the shoulder of the workpiece and second surface means for grinding the cylindrical side of the workpiece, means for rotating said grinding wheel about the second axis, means for moving said wheel slide along a path extending at an acute angle to the first axis whereby upon movement of said wheel slide along the path said grinding wheel has a component of movement extending parallel to the first axis and a component of movement extending perpendicular to the first axis, and control means for controlling movement of said wheel slide relative to said base along the path extending at an acute angle to the first axis, said control means including first register means for storing data corresponding to the position of one of said surface means on said grinding wheel relative to a first plane extending perpendicular to the first axis, second register means for storing data corresponding to the position of the other of said surface means on said grinding wheel relative to a second plane in which the first axis is disposed, means for changing the data stored in said first register means by an amount corresponding to the magnitude of the component of movement of said wheel slide parallel to the first axis and for changing the data stored in said second register means by an amount corresponding to the magnitude of the component of movement of said wheel slide perpendicular to the first axis upon movement of said wheel slide along the path.

46. An appartus as set forth in claim 45 further including detector means for determining the distance between a reference surface on the workpiece and a predetermined reference plane when the workpiece is in an initial position, and means for varying the data stored in said first register means by an amount corresponding to the distance between the reference surface on the workpiece and the predetermined reference plane when the workpiece is in the initial position to compensate for initially positioning the reference surface on the workpiece at a position in which the reference surface is spaced apart from the reference plane.

47. An apparatus as set forth in claim 45 further including a dressing tool, means for effecting movement of said dressing tool and grinding wheel relative to each other to remove material from said grinding wheel and effect a change in the positions of said first and second surface means relative to the second axis, means for varying the data stored in said first register means by an amount which is a function of the extent of the change in position of said one surface means due to removal of material from said grinding wheel by said dressing tool, and means for varying the data stored in said second register means by an amount which is a function of the change in position of said other surface means due to removal of material from said grinding wheel by said dressing tool.

48. An apparatus for use in grinding a workpiece having a radially projecting shoulder and a cylindrical side, said apparatus comprising a base, a workpiece carriage movably mounted on said base, means for rotatably supporting the workpiece on said carriage, means for rotating the workpiece relative to said carriage about a first axis, motor means for moving said carraige relative to said base to move the workpiece along said first axis, a wheel slide movably mounted on said base, a grinding wheel rotatably supported on said wheel slide and rotatable about a second axis which extends at an acute angle to the first axis, said grinding wheel having first surface means for grinding the shoulder of the workpiece and second surface means for grinding the cylindrical side of the workpiece, means for rotating said grinding wheel about the second axis, means for moving said wheel slide along a path extending at an acute angle to the first axis, and control means for controlling movement of said wheel slide relative to said base along the path extending at an acute angle to the first axis and for controlling movement said carriage relative to said base to effect engagement of said first surface means on said grinding wheel with the shoulder of the rotating workpiece and to effect engagement of said second surface means on said grinding wheel with the side of the rotating workpiece to grind the side and shoulder of the workpiece, said control means including means for repetitively reversing the direction of operation of said motor means to reciprocate the workpiece along the first axis through a distance which is less than the extent of said second surface means along the first axis while said second surface means is disposed in engagement with the cylindrical side of the workpiece.

49. An apparatus as set forth in claim 48 wherein said means for repetitively reversing the direction of operation of said motor means inlcudes means for repetitively reversing the direction of operation of said motor means when said first surface means is disposed in engagement with the radially projecting shoulder of the workpiece and for repetitively reversing the direction of operation of said motor means when said first surface means is spaced from the radially projecting shoulder of the workpiece by a predetermined distance which is less than the extent of said second surface means along the first axis.

50. An apparatus as set forth in claim 49 wherein said control means inludes register means for storing data corresponding to the position of said first surface means relative to a reference plane, said means for repetitively reversing the direction of operation of said motor means being effective to reverse the direction of operation of said motor means when the data stored in said register means is a first predetermined value corresponding to engagement of said first surface means with the radially projecting shoulder of the workpiece and when the data stored in said register means is a second predetermined value corresponding to said first surface means being spaced from the radially projecting shoulder by the perdetermined distance.

51. An apparatus as set forth in claim 50 further including detector means for determining the distance between a reference surface on the workpiece and a reference plane when the workpiece is in an intial position, and means for varying the data stored in said register means by an amount corresponding to the distance between the reference surface on the workpiece and the predertemined reference plane when the workpiece is in the initial position to compensate for initially positioning the reference surface on the workpiece at a position in which the reference surface is spaced apart from the reference plane.

52. An apparatus as set forth in claim 51 further including means for varying the data stored in said register means as a function of the cosine of the acute angle between the path of movement of said wheel slide and the first axis upon movement of said wheel slide along the path.

53. An apparatus for use in grinding a workpiece, said apparatus comprising means for rotating the workpiece about a first axis, a grinding wheel having first and second surfaces for engaging the workpiece during a grinding operation, means for rotating said grinding wheel about a second axis which extends at an acute angle to the first axis, means for moving the grinding wheel along a path extending at an acute angle to the first axis, first register means for storing data corresponding to the position of the first surface on the grinding wheel relative to a reference plane extending perpendicular to the first axis, second register means for storing data corresponding to the position of the second surface on the grinding wheel relative to the first axis, and means for changing the data stored in said first and second register means upon movement of said grinding wheel along the path extending at an acute angle to the first axis.

54. An apparatus as set forth in claim 53 further including means for moving the workpiece along the first axis and means for changing the data stored in said first register means upon movement of the workpiece along the first axis while maintaining the data stored in said second register means constant.

55. An apparatus as set forth in claim 53 wherein said means for changing the data stored in said first and second register means includes means for varying the data stored in said first register means as a function of the distance which the grinding wheel moves along the path extending at an acute angle to the first axis and as a function of the cosine of the acute angle between the path and the first axis and means for varying the data stored in said second register means as a function of the distance which the grinding wheel moves along the path and as a function of the sine of the acute angle between the path and the first axis.

56. An apparatus for use in grinding a workpiece, said apparatus comprising means for rotating the workpiece about the first axis, a grinding wheel having first and second surfaces for engaging a workpiece during a grinding operation, means for rotating said grinding wheel about a second axis which extends at an acute angle to the first axis, means for moving said grinding wheel along a path extending at an acute angle to the first axis, first register means for storing data corresponding to the position of the first surface on the grinding wheel relative to a reference plane disposed in a predetermined position relative to the workpiece and extending transversely to the first axis, second register means for storing data corresponding to the position of the second surface on the grinding wheel relative to the first axis, means for changing the data stored in said first and second register means upon movement of the grinding wheel along the path extending at an acute angle to the first axis, a wheel dressing tool, means for effecting movement of said wheel dressing tool and grinding wheel relative to each other to remove material from said grinding wheel and effect a change in the positions of said first and second surfaces on said grinding wheel relative to the second axis, means for varying the data stored in said first register means by an amount which is a function of the extent of the change in position of said first surface due to removal of material from said grinding wheel by said wheel dressing tool, and means for varying the data stored in said second register means by an amount which is a function of the change in position of said second surface due to removal of material from said grinding wheel by said wheel dressing tool.

57. An apparatus for use in grinding a workpiece having a reference surface and a radially projecting shoulder, said apparatus comprising a base which is disposed in a predetermined position relative to a reference plane, a workpiece carriage movably mounted on said base, means for rotatably supporting the workpiece on said carriage, means for moving said carriage relative to said base along a first path to move the shoulder and reference surface on the workpiece relative to said base and the reference plane, a wheel slide movably mounted on said base, a grinding wheel rotatably supported on said wheel slide, said grinding wheel having a circular surface which engages the shoulder on the workpiece during grinding of the workpiece, means for moving said wheel slide relative to said base along a second path which extends transversely to the first path to move said grinding wheel into and out of engagement with the workpiece, control means for controlling movement of said wheel slide relative to said base along the second path, said control means including register means for storing data corresponding to the position of the circular surface on said grinding wheel relative to said reference plane, and means for initially locating the workpiece relative to the reference plane, said means for initially locating the workpiece relative to the reference plane includes means for effecting movement of said carriage along the first path to an initial position in which the reference surface on the workpiece is adjacent to the reference plane and is spaced apart from the reference plane by a variable distance, means for determining the magnitude of the variable distance which the reference surface is spaced apart from the reference plane when said carriage is in the initial position, and means for changing the data stored in said register means by an amount corresponding to the magnitude of the variable distance between the reference surface and the reference plane when said carriage is in the initial position.

58. An apparatus as set forth in claim 57 wherein said means for determining the magnitude of the variable distance includes a probe member having surface means for engaging the reference surface on the workpiece when said carriage is in the initial position and transducer means for providing an output signal indicative of the position of said surface means on said probe member relative to the reference plane when said surface means on said probe member is disposed in engagement with the reference surface on the workpiece.

59. An apparatus as set forth in claim 57 wherein the second path along which said wheel slide is movable extends at an acute angle to the first path along which said workpiece carriage is movable, said control means including means for changing the data stored in said register means upon movement of said wheel slide along the second path and means for changing the data stored in said register means upon movement of said workpiece carriage along the first path.

* * * * *

UNITED STATES PATENT AND TRADEMARK OFFICE
CERTIFICATE OF CORRECTION

PATENT NO. : 4,205,488
DATED : June 3, 1980
INVENTOR(S) : Gary E. Englander et al.

It is certified that error appears in the above-identified patent and that said Letters Patent are hereby corrected as shown below:

Column 29, line 13, change "shaft" to --first--

Column 29, line 57, change the second instance of "the" to --a--

Column 29, line 57, change "of a" to --on the--

Column 31, line 2, add --amount.--

Column 32, line 57, change "correspondingly" to --corresponding--

Signed and Sealed this

Twenty-third Day of September 1980

[SEAL]

Attest:

SIDNEY A. DIAMOND

Attesting Officer

Commissioner of Patents and Trademarks